United States Patent [19]

Oda et al.

[11] Patent Number: 4,942,999
[45] Date of Patent: Jul. 24, 1990

[54] METAL-CERAMIC JOINED COMPOSITE BODIES AND JOINING PROCESS THEREFOR

[75] Inventors: Isao Oda; Takao Soma, both of Nagoya; Nobuo Tsuno, Kasugai; Takashi Ando; Yoshizumi Nakasuji, both of Nagoya, all of Japan

[73] Assignee: NGK Insulators, Inc., Japan

[21] Appl. No.: 236,145

[22] Filed: Aug. 25, 1988

[30] Foreign Application Priority Data

Aug. 31, 1987 [JP] Japan .................. 62-215187
Dec. 11, 1987 [JP] Japan .................. 62-311836
Mar. 22, 1988 [JP] Japan .................. 63-65864
Jun. 3, 1988 [JP] Japan .................. 63-135721

[51] Int. Cl.$^5$ ............... B23K 1/19; B23K 103/16
[52] U.S. Cl. ............... 228/124; 228/118; 228/215; 416/241 B; 428/634; 428/635
[58] Field of Search ............... 228/122, 124, 118, 214, 228/263.12, 215; 416/241 B; 428/634, 635

[56] References Cited

U.S. PATENT DOCUMENTS

| | | | |
|---|---|---|---|
| 4,659,245 | 4/1987 | Hirao et al. | 416/241 B |
| 4,723,863 | 2/1983 | Takagi et al. | 228/132 |
| 4,747,722 | 5/1988 | Kawaguchi et al. | 416/241 B |
| 4,761,117 | 8/1988 | Oda et al. | 416/241 R |
| 4,778,345 | 10/1988 | Ito et al. | 416/241 B |
| 4,798,320 | 1/1989 | Fang | 228/124 |

FOREIGN PATENT DOCUMENTS

| | | |
|---|---|---|
| 0142334 | 5/1985 | European Pat. Off. . |
| 0195640 | 9/1986 | European Pat. Off. . |
| 0215554 | 3/1987 | European Pat. Off. . |
| 0233772 | 8/1987 | European Pat. Off. . |
| 3535511 | 4/1986 | Fed. Rep. of Germany ...... 228/120 |
| 59-5701 | 1/1984 | Japan . |
| 90879 | 5/1985 | Japan .................. 228/263.12 |
| 141681 | 7/1985 | Japan .................. 228/263.12 |
| 61-108329 | 7/1986 | Japan . |
| 61-169164 | 7/1986 | Japan . |
| 61-219766 | 9/1986 | Japan . |
| 61-164234 | 10/1986 | Japan . |
| 61-180137 | 11/1986 | Japan . |
| 62-78172 | 4/1987 | Japan . |

*Primary Examiner*—Nicholas P. Godici
*Assistant Examiner*—Samuel M. Heinrich
*Attorney, Agent, or Firm*—Arnold, White & Durkee

[57] ABSTRACT

Composite bodies comprise a metallic member and a ceramic member integrally joined together by joining a projection of the ceramic member to a recess of the metallic member. Their joining strength is improved by substantially limiting brazing metal to an interface between the outer peripheral surface of the projection of the ceramic member and the innner peripheral surface of the recess of the metallic member. The joining strength is also improved by forming a groove around the outer periphery of the metallic member at the joined end. The joining strength is also improved by providing a space or an intermediate member between a tip end surface of the projection and a bottom surface of the recess and attaining the relation: $G, L_1, (\alpha - \alpha') \times T_S - T_R)$ in which $G, L_1, \alpha, \alpha', T_S$ and $T_R$ are the thickness of the space or the intermediate member, a distance from the bottom surface of the recess of the metallic member to the joining end, a coefficient of thermal expansion of the metallic member, a coefficient of thermal expansion of the ceramic member, a solidifying temperature of the brazing metal, and room temperature, respectively. The joining strength is also improved by radially enlarging the recess near the opening and thinning the brazing metal toward the opening of the recess.

18 Claims, 14 Drawing Sheets

FIG_1
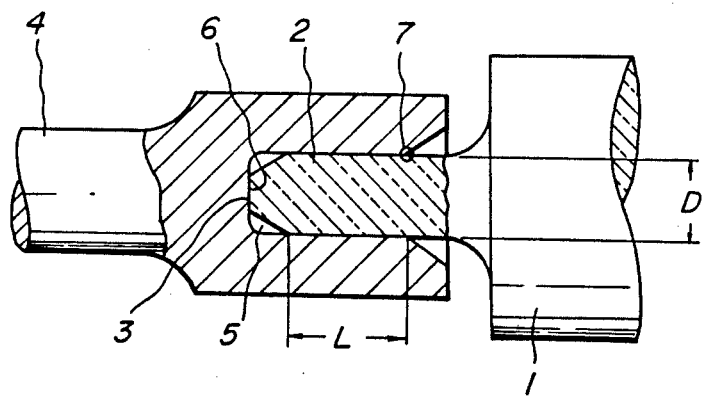
FIG_2
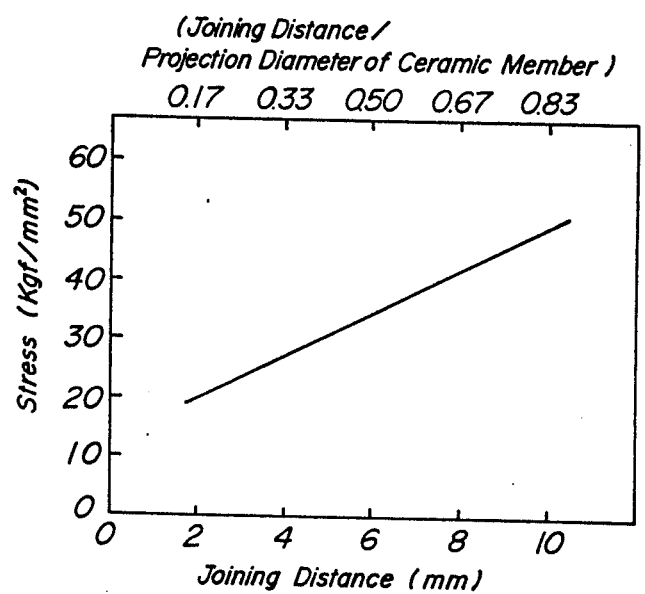

FIG_3
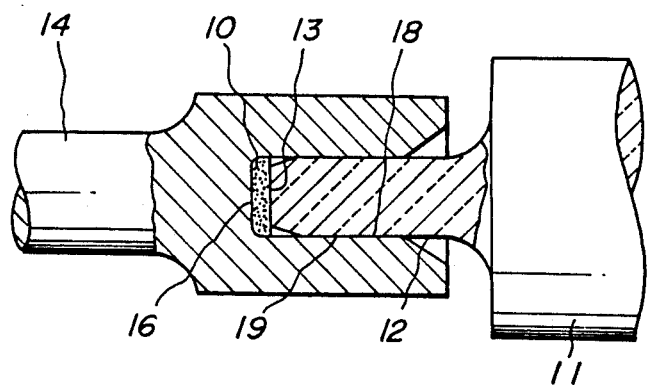
FIG_4
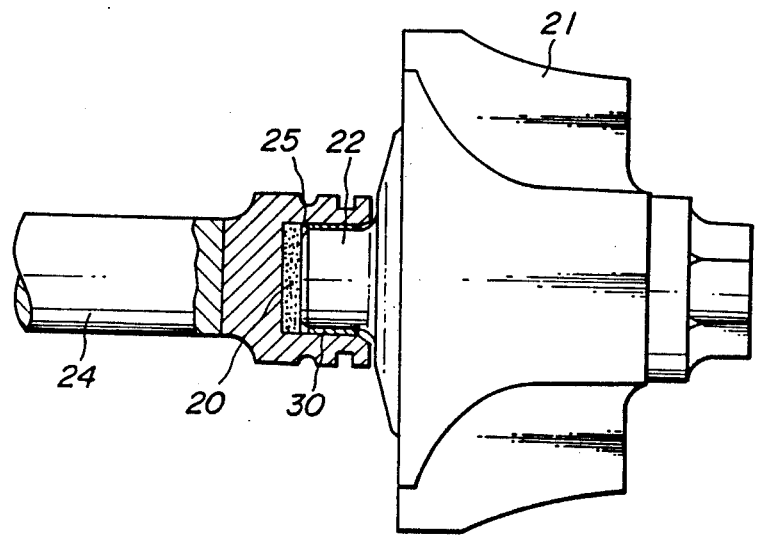

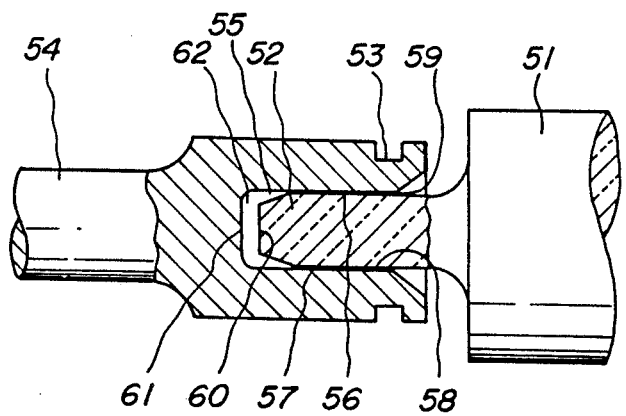
FIG_5

FIG_6
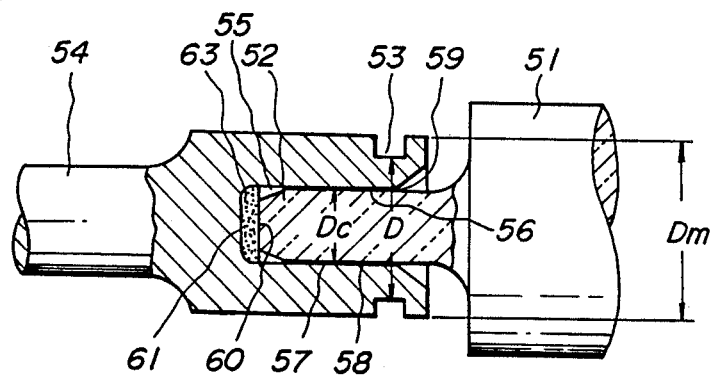
FIG_7
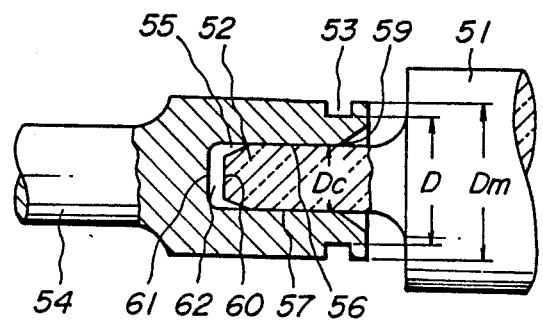

FIG_8a
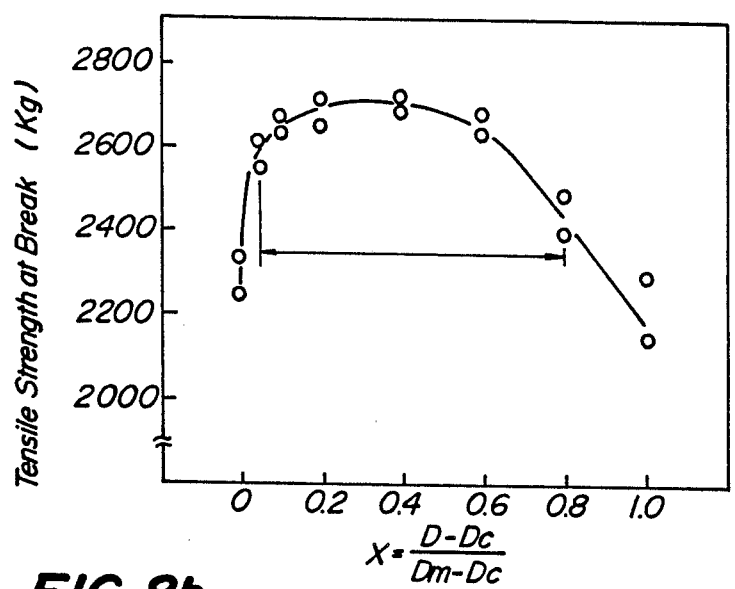
FIG_8b
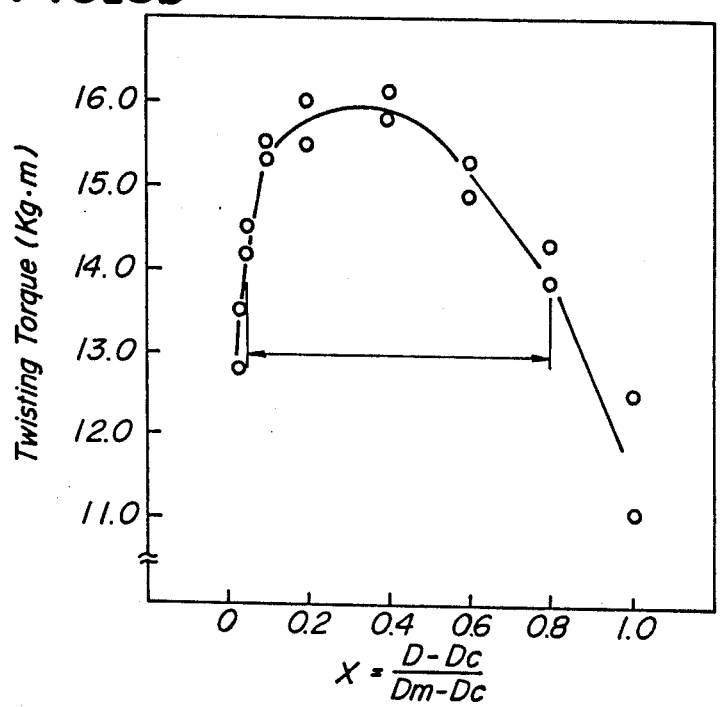

FIG_9
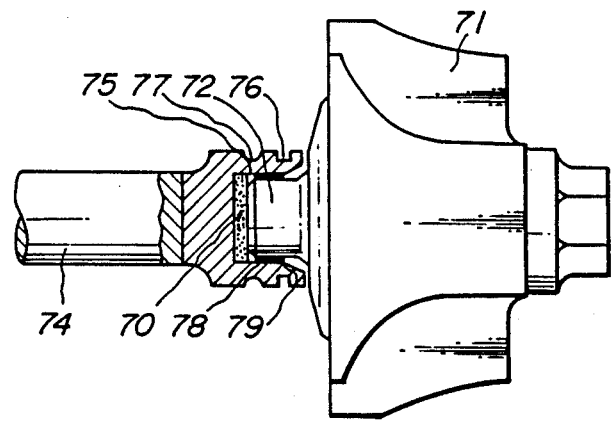
FIG_10
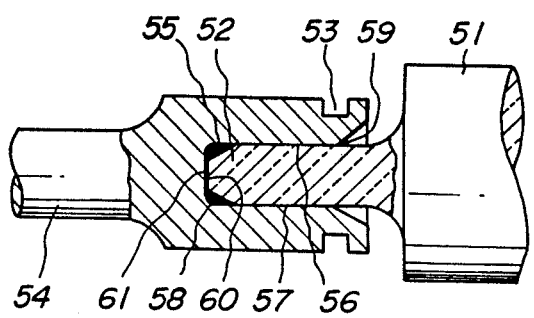

FIG_11
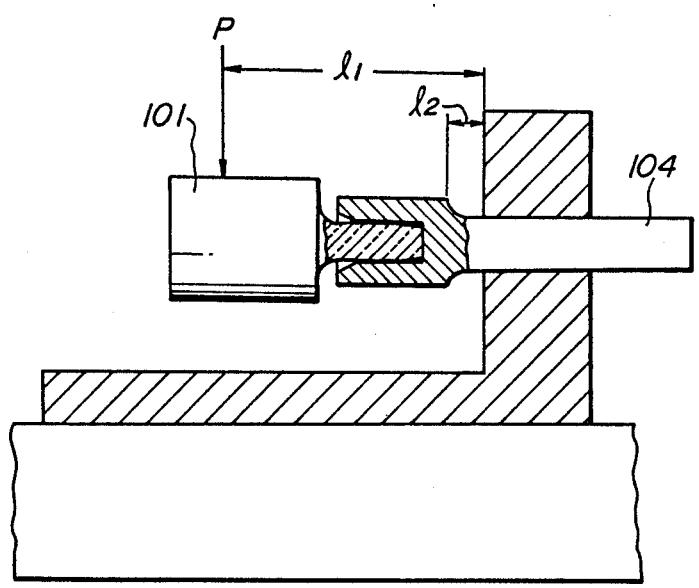

FIG_12a
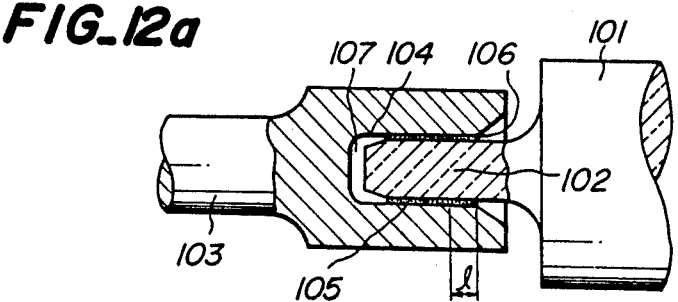
FIG_12b
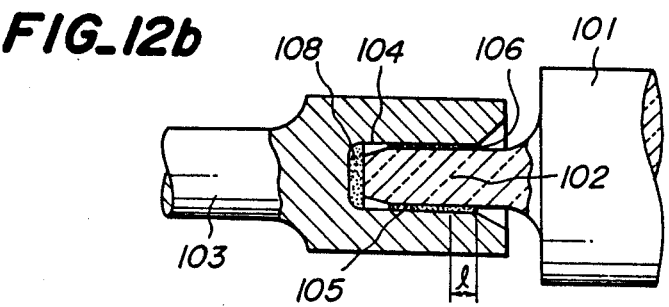
FIG_12c
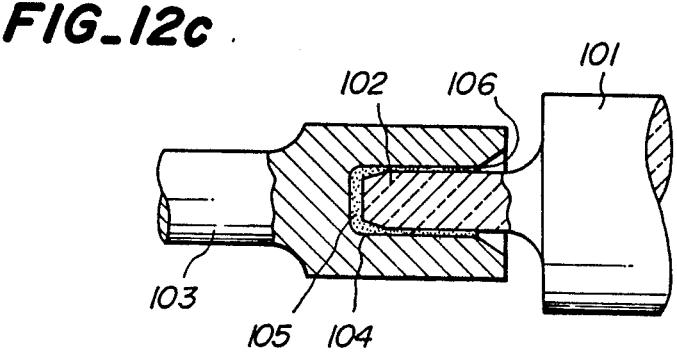

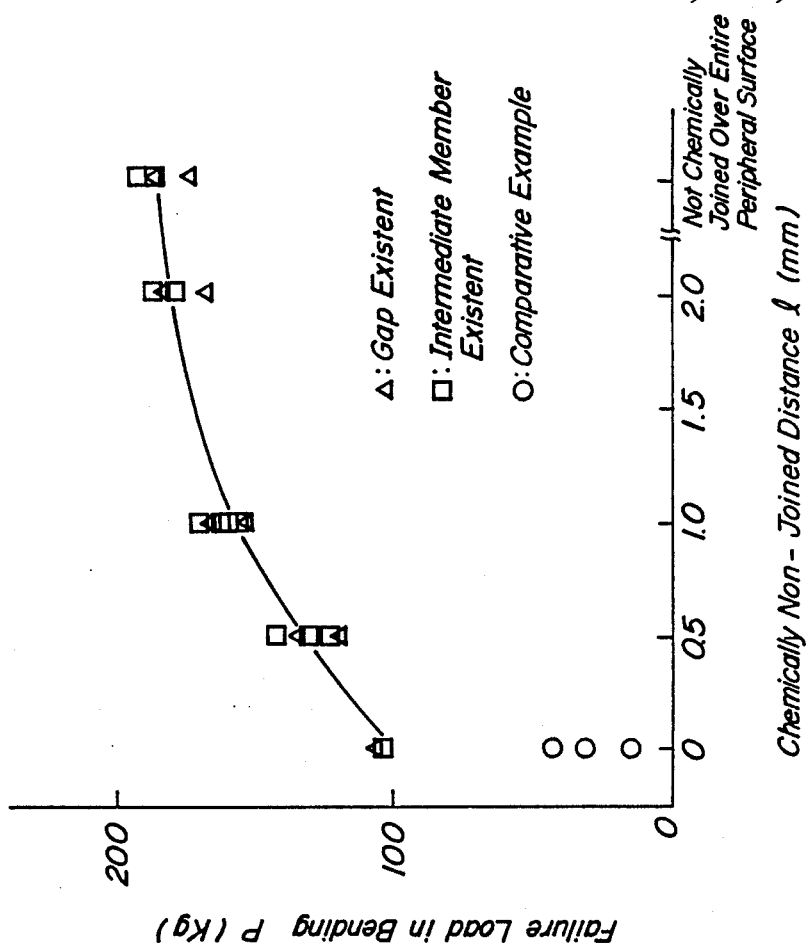
FIG_14

FIG_15
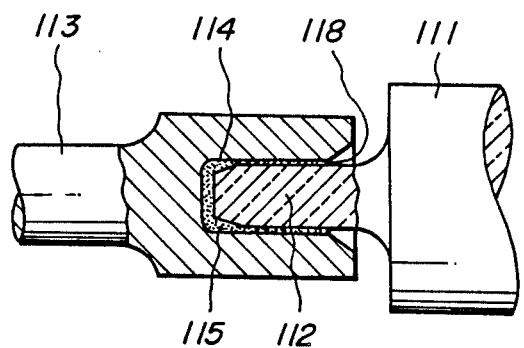

FIG_16
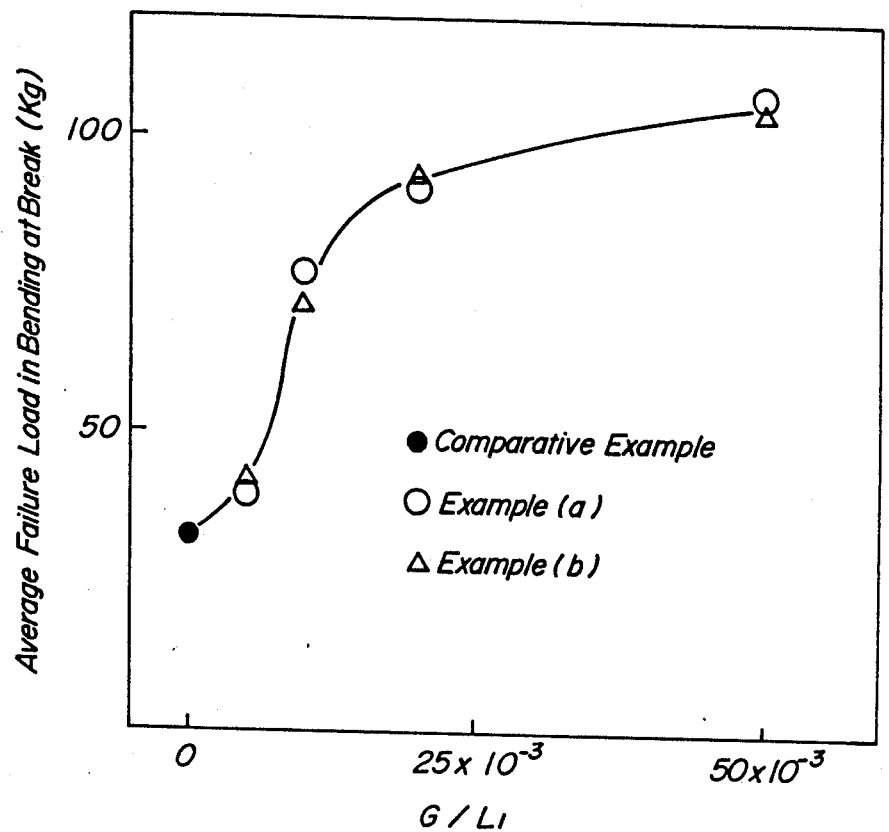

FIG_17a
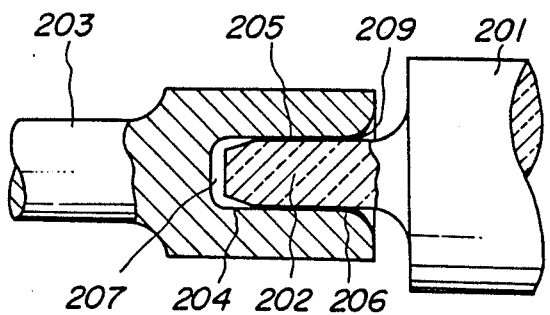
FIG_17b
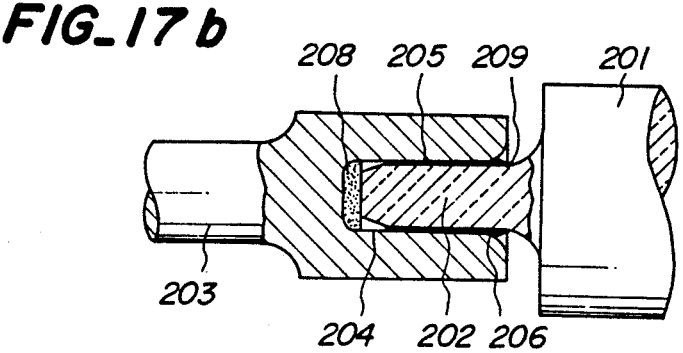
FIG_17c
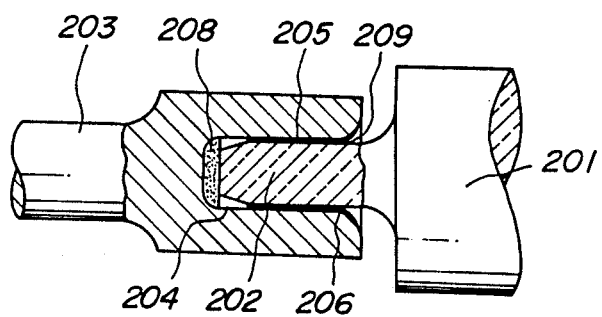

FIG_18a
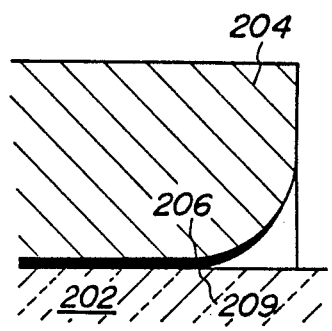
FIG_18b
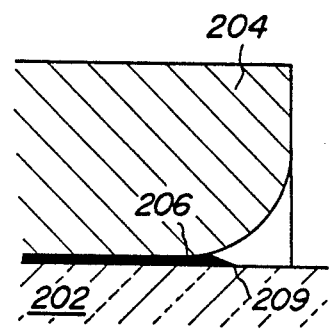
FIG_19a
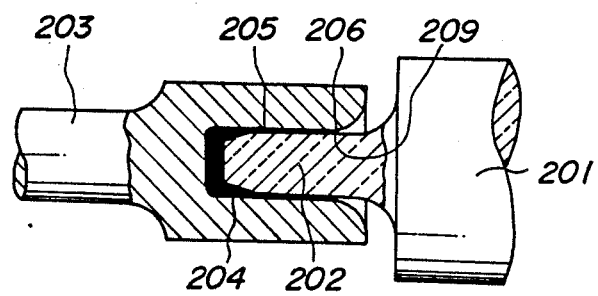
FIG_19b
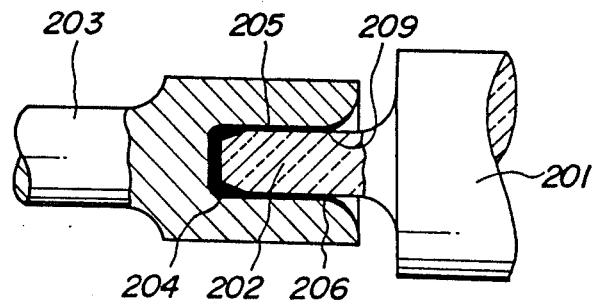

METAL-CERAMIC JOINED COMPOSITE BODIES AND JOINING PROCESS THEREFOR

BACKGROUND OF THE INVENTION (1) Field of the Invention:

The present invention relates to metal-ceramic joined composite bodies and a joining process therefor. More particularly, the invention relates to metal-ceramic joined composite bodies in which a metallic member and a ceramic member are integrally joined together by brazing or a mechanical means such as press fitting as well as a joining process therefor.

(2) Related Art Statement:

Since ceramics such as zirconia, silicon nitride, and silicon carbide have excellent properties such as mechanical strength, heat resistance and wear resistance, they have been put into practical use as high temperature structural materials or wear-resisting materials for gas turbine engine parts, engine parts, etc. However, since ceramics are generally hard and brittle, and they are inferior in shapability and processability to metallic materials. Further, since ceramics have poor toughness, they have poor impact resistance. For these reasons, it is difficult to form mechanical parts such as engine parts from ceramic materials only. Thus, ceramics are generally used in the form of composite structures in which a metallic member is joined to a ceramic member.

For instance, Japanese Utility Model Registration Application Laid-open No. 61-108,329 discloses a structural body in which a columnar fitting portion of a ceramic member is fitted into a cylindrical fitting hole of a metallic member and both the members are integrally joined together by brazing. However, when members made of two kinds of materials having different coefficients of thermal expansion are joined together between the entire outer surface of the columnar fitting portion and the entire inner surface of the cylindrical fitting hole as in this structure, excess residual stress occurs so that the ceramic member is likely to break. Thus, there remains a problem in a practical use.

In order to solve the above problem, it has been attempted to limit a joining area between a ceramic member and a metallic member to a specific zone. For instance, Japanese patent application Laid-open No. 61-219,766 discloses a structure in which an end portion of a ceramic shaft is inserted into a blind hole formed in a metallic shaft, a tip end surface of the ceramic shaft and a bottom surface of the blind hole to be butted together are joined through an intermediate layer which can be bonded to both the ceramic and the metal, while between the outer peripheral surface of the ceramic shaft and the inner peripheral surface of the blind hole of the metallic shaft is interposed another intermediate material which is not bonded to either the ceramic or the metal.

Further, EP-A-0195640 discloses a process for joining a structural body in which a projection formed on a ceramic member is inserted into a recess formed in a metallic member, and the outer peripheral surface of the projection is integrally joined to the inner peripheral surface of the recess through an active brazing metal, while a space is provided between a tip end surface of the projection and a bottom surface of the recess.

Furthermore, Japanese patent application Laid-open No. 61-169,164 discloses a joint structure in which a projection formed on a ceramic member is fitted into a sleeve portion formed in a metallic member, and the outer peripheral surface of the projection is partially bonded to the inner peripheral surface of the sleeve portion with a brazing metal.

However, according to the structure described in Japanese Patent Application Laid-open No. 61-219,766, if the interference fitting effect is lost between the outer peripheral surface of the ceramic shaft and the inner peripheral surface of the blind hole of the metallic shaft due to rises in use temperatures, necessary strength must be assured by a joined portion between the butted tip end surface of the ceramic shaft and the bottom surface of the blind hole of the metallic shaft. Thus, if the ceramic shaft is slender and the use temperature is high, it is unfavorably difficult to assure such necessary strength.

On the other hand, according to the process for joining the structure disclosed in No. EP-A-0195640, an active brazing metal is arranged between the surface of the ceramic member and the metallic member to be joined together, and both the members are joined together by melting the brazing metal. When the brazing is carried out in this manner, defects such as bubbles or shrinkage cavities are likely to occur in the brazing metal so that sufficient joining strength cannot be obtained.

According to the structure described in Japanese Patent Application Laid-open No. 61-169,164, a metallizing layer is formed on a joining surface of the projection formed on the ceramic member, and the metallizing layer is brazed to the inner peripheral surface of the metallic member. Although this method is excellent for the purpose of limiting a portion of the ceramic member to be brazed, it not only needs an extra step for metallizing the ceramic member, but also the ceramic member must be made of a ceramic material which can allow the formation of the metallizing layer.

The above problems are to be first solved by the present invention.

Problems of the following prior art have been considered to be secondarily solved by the present invention.

Japanese Utility Model Registration Application Laid-open No. 59-5,701 discloses a structure in which a sleeve made of a metallic material having a coefficient of thermal expansion near that of a ceramic vane wheel is connected to a boss of the ceramic vane wheel, and the metallic sleeve is connected to a metallic shaft, while a space is provided between the ceramic vane wheel and the metallic sleeve.

Japanese Patent Application Laid-open No. 62-78,172 discloses a structure in which a ceramic shaft member is joined to a metallic sleeve member by fitting, and a groove is formed around the outer periphery of the sleeve along a position corresponding to a joining end between the sleeve and the ceramic shaft member.

In the method for joining the structure disclosed in Japanese Patent Application Laid-open No. 62-78,172, a brazing metal is arranged between surfaces of the ceramic shaft and the sleeve to be joined together, and the ceramic shaft and the metallic shaft are integrally joined together with the buffer metallic member by melting the brazing metal in situ. Thus, defects such as bubbles or shrinkage cavities are likely to occur in the brazing metal, so that sufficient joining strength cannot be obtained.

In the structure disclosed in Japanese Utility Model Registration Application Laid-open No. 59-5,701, since stress is likely to concentrate upon the joining end between the boss of the ceramic vane wheel and the metallic sleeve during use, joining strength is unfavorably poor.

Such problems are to be secondarily solved by the present invention.

Problems of the following prior art are to be thirdly and fourthly solved by the present invention.

Metal-ceramic composite bodies have been known, which are designed such that in a joined portion in which an outer surface of a projection of a ceramic member is joined to an inner surface of a recess of a metallic member by brazing, the projection is firmly fixed to a brazing metal present between the outer surfaces of the projection of the ceramic member and the inner surface of the recess of the metallic member through chemical joining over the entire surface thereof.

In general, when a projection of a ceramic member is to be joined to a recess of a metallic member by brazing, assume a case where temperature is lowered from a solidifying point of the brazing metal to room temperature. In this case, since the metallic member or the brazing metal has a greater coefficient of thermal expansion while that of the ceramic member is smaller, shrank amounts of the metallic member or the brazing metal are greater due to difference in coefficient of thermal expansion. However, as mentioned above, in the structure in which the projection of the ceramic member is firmly fixed to the brazing metal over the entire contact surface between the projection and the brazing metal through chemical joining, the brazing metal is firmly fixed to the ceramic member due to shrinkage of the metallic member or the brazing metal during cooling. Consequently, the brazing metal cannot slip relative to the ceramic member at their joining interface so that the shrinking force of the metallic member or the brazing metal acts upon the ceramic member and excessive tensile stress occurs in the joining end of the ceramic member. Further, no investigations have been considered upon the relation between the surface of the tip end of the projection and the bottom surface of the recess.

Therefore, tensile stress concentration particularly upon the joining end of the ceramic member increases, which reduces resistance of the joined composite body against bending or twisting, so that reliability is deteriorated.

Such problems are to be thirdly fourthly solved by the present invention.

The following problems are to be fifthly solved by the present invention.

Furthermore, Japanese Utility Model Registration Application Laid-open No. 61-164,234 discloses a structure in which a projection of a ceramic member is joined to a recess of a metallic member with a brazing metal, and a space is formed on an end side of an opening of the recess to mitigate stress concentration occurring at the joining end due to difference in thermal expansion between the ceramic member and the metallic member or between the ceramic member and the brazing metal, while the members are joined at the remaining portion with the brazing metal. Japanese Utility Model Registration Application Laid-open No. 60-180,137 proposes that the brazing metal is interposed up to a radially outwardly enlarged portion formed at an opening portion of a recess of the metallic member in such a structure.

Although stress concentration upon the joining end can be mitigated to some extent by the joining structures in the above-mentioned prior art, satisfactory effect can not be obtained. That is, since a sufficient space is not provided at a joining bottom portion between the surface of the tip end of the projection of the ceramic member and the bottom surface of the recess of the metallic member, the ceramic member and the metallic member are brought into contact with each other due to a difference in thermal expansion therebetween during cooling from the solidifying point of the brazing metal to room temperature on brazing. Since the ceramic member has a smaller thermal expansion than that of the metallic member, the metallic member cannot shrink sufficiently to cause too much tensile stress upon the ceramic member. Since the metallic member cannot be fully shrunk due to the ceramic member having a smaller thermal expansion than that of metallic member, excess tensile stress occurs in the ceramic member. Since stress concentration particularly upon the joining end increases, resistance of the joined composite body against bending or twisting is lowered.

The problems mentioned just above are to be fifthly solved by the present invention.

SUMMARY OF THE INVENTION

It is an object of the present invention to overcome the above-mentioned problems, and provide metal-ceramic joined composite bodies which can easily be produced, and have extremely high joining strength both at room temperature and at elevated temperatures, as well as a joining process therefor.

According to a first aspect of the present invention, there is a provision of a metal-ceramic joined composite body in which a projection formed on a ceramic member is inserted into a recess formed in a metallic member. The outer peripheral surface of the projection is integrally joined to the inner peripheral surface of the recess by brazing. The invention is characterized in that the joining between the metallic member and the ceramic member is substantially limited to the joining between the outer peripheral surface of the projection and the inner peripheral surface of the recess by forming a thin layer made of a material not joinable to the brazing metal on a surface of a tip end of the projection and interposing a low elasticity intermediate member made of a material not joinable to the brazing metal between the surface of the tip end of the projection and the bottom surface of the recess.

The joining process according to the first aspect of the present invention is directed to a process for joining a metal-ceramic joined composite body in which a projection formed on a ceramic member is inserted into a recess formed in a metallic member and the outer peripheral surface of the projection is integrally joined to the inner peripheral surface of the recess of the metallic member by brazing, and comprises the steps of:

(a) forming the recess and the projection in or on one end of the metallic member and the ceramic member, respectively;

(b) plating Ni on an inner surface of the recess of the metallic member to be joined, placing a low elasticity member on a bottom surface of the recess, and arranging an active metal-containing brazing metal on the low elasticity member;

(c) coating graphite on a tip end of the projection;

(d) forming a joining assembly of the ceramic member and the metallic member by inserting the projection into the recess;

(e) melting the brazing metal by heating the above assembly at temperatures higher than a melting point of the brazing metal in vacuum or in an inert atmosphere, and filling the molten brazing metal in a gap between the outer peripheral surface of the projection and the inner peripheral surface of the recess; and (f) completing joining between the outer peripheral surface of the projection of the ceramic member and the inner peripheral surface of the recess of the metallic member by cooling the assembly and solidifying the brazing metal.

According to a second aspect of the present invention, there is a provision of a metal-ceramic joined composite body in which a projection formed on a ceramic member is inserted into a recess formed in a metallic member, and which is characterized in that joining is effected only between the outer peripheral surface of the projection and the inner peripheral surface of the recess while a tip end surface of the projection is not joined to the bottom surface of the recess. A groove is formed around the substantially entire circumference of the outer periphery of the metallic member such that a joining end between the projection and the recess may be located at a position corresponding to the groove.

The joining process according to the second aspect of the present invention is directed to a process for joining a metal-ceramic joined composite body in which a projection formed on a ceramic member is inserted into a recess formed in a metallic member and the outer peripheral surface of the projection is integrally joined to the inner peripheral surface of the recess by brazing, and comprises the steps of:

(a) forming the recess and the projection in or on one end of the metallic member and the ceramic member, respectively;

(b) plating Ni on an inner surface of the recess of the metallic member to be joined, placing a low elasticity member on a bottom surface of the recess, and arranging an active metal-containing brazing metal on the low elasticity member;

(c) coating graphite on a tip end of the projection;

(d) forming a joining assembly of the ceramic member and the metallic member by inserting the projection inside the recess;

(e) melting the brazing metal by heating the above assembly at temperatures higher than a melting point of the brazing metal in vacuum or in an inert atmosphere, and filling the molten brazing metal in a gap between the outer peripheral surface of the projection and the inner peripheral surface of the recess;

(f) completing the joining between the outer peripheral surface of the projection of the ceramic member and the inner peripheral surface of the metallic member by cooling the assembly and solidifying the brazing metal; and (g) forming a groove around the substantially entire circumference in the outer periphery of the metallic member at a position corresponding to a joining end between the outer peripheral surface of the projection of the ceramic member and the inner peripheral surface of the recess of the metallic member. If a low elasticity member is not placed in the step (b) of the process above mentioned, the space is provided between a surface of a tip end of the projection and a bottom surface of the recess.

Another joining process according to the second aspect of the present invention is directed to a process for joining a metal-ceramic joined composite body in which a projection formed on a ceramic member is inserted into a recess formed in a metallic member and the outer peripheral surface of the projection is integrally joined to the inner peripheral surface of the recess by brazing, and comprises the steps of:

(a) forming the recess and the projection in one end of the metallic member and on the ceramic member, respectively;

(b) forming a metallizing layer on the outer peripheral surface of the projection of the ceramic member to be joined and plating Ni on the metallizing layer;

(c) placing a low elasticity member on a bottom surface of the recess, and arranging a brazing metal containing no active metal on the low elasticity member, and forming a joining assembly of the ceramic member and the metallic member by inserting the projection into the recess;

(d) melting the brazing metal by heating the above assembly at temperatures higher than a melting point of the brazing metal in vacuum or in an inert atmosphere, and filling the molten brazing metal in a gap between the outer peripheral surface of the projection and the inner peripheral surface of the recess;

(e) completing joining between the outer peripheral surface of the ceramic member and the inner peripheral surface of the metallic member by cooling the assembly and solidifying the brazing metal; and (f) forming a groove around the substantially entire circumference in the outer periphery of the metallic member at a position corresponding to a joining end between the outer peripheral surface of the projection of the ceramic member and the inner peripheral surface of the recess of the metallic member.

According to a third aspect of the present invention, there is provision of a metal-ceramic joined composite body in which a projection formed on a ceramic member is inserted into a recess formed in a metallic member, joining is integrally effected between the members by brazing, and which is characterized in that the projection is not firmly fixed to a brazing metal by chemical joining at at least a joining end of a joined portion between the outer peripheral surface of the projection of the ceramic member and the inner peripheral surface of the metallic member. A space or a low elasticity intermediate member made of a material not joinable to the brazing metal is provided between a surface of a tip end of the projection and a bottom surface of the recess.

According to a fourth aspect of the present invention, there is a provision of a metal-ceramic joined composite body in which a projection formed on a ceramic member is inserted into a recess formed in a metallic member, and the outer peripheral surface of the projection is integrally joined to the inner peripheral surface of the recess by brazing, and which is characterized in that a space or a low elasticity intermediate member made of a material not joinable to a brazing metal is provided between a surface of a tip end of the projection of the ceramic member and a bottom surface of the recess of the metallic member. A thickness G of the space or the intermediate member is set to meet the following inequality:

$$\frac{G}{L_1} > (a - a') \times (T_S - T_R)$$

in which $L_1$, $a$, $a'$, $T_S$ and $T_R$ are a distance from the bottom surface of the recess of the metallic member to the joining end, a coefficient of thermal expansion of the metallic member, a coefficient of thermal expansion of the ceramic member, a solidifying temperature of the brazing metal, and room temperature, respectively.

According to a fifth aspect of the present invention, there is a provision of a metal-ceramic joined composite body in which a projection formed on a ceramic member is inserted into a recess formed in a metallic member, and the ceramic member and the metallic member are integrally joined while a brazing metal is interposed between the outer peripheral surface of the projection and the inner peripheral surface of the recess, and which is characterized in that the thickness of the brazing metal interposed between the outer peripheral surface of the projection and the inner peripheral surface of the recess is decreased toward an opening of the recess beyond a diameter-enlargement-starting position of the recess. A space or a low elasticity intermediate member made of a material not joinable to the brazing metal is interposed between a surface of a tip end of the projection and a bottom surface of the recess.

With respect to each of the respective aspects of the present invention, their functions will be explained below.

The metal-ceramic joined composite body according to the first aspect of the present invention is based on a discovery that the joined composite body having high joining strength and reliability can be obtained by substantially limiting the joining position between the metallic member and the ceramic member to joining between the outer peripheral surface of the projection formed on the ceramic member and the inner peripheral surface of the recess formed in the metallic member, and avoiding direct contact between the surface of the tip end of the projection and the bottom surface of the recess.

If the joining position is unfavorably outside the above limitation, residual stress occurring at the joining end between the members becomes excessive so that sufficient joining strength cannot be obtained. For instance, if the joining is effected all over the entire contact zone between the outer surface of the projection and the inner surface of the recess, it is feared that the ceramic member is broken at the joining end due to the above residual stress during cooling from the joining temperature.

The joining is unfavorably carried out between the tip end surface of the projection and the bottom surface of the recess, because if the diameter of the projection is small, a joining area becomes smaller to lower strength at the joined portion. To the contrary, when the outer peripheral surface of the projection is joined to the inner peripheral surface of the recess at the contact portion only, the brazing metal, the ceramic member, and the metallic member are reacted, so that the firm joined portion is formed between the members. Since an effect of shrinkage fitting is additionally carried out during cooling from the joining temperature, high strength can stably be obtained.

The above limitation upon the joined position is attained by forming a thin film composed of a material not joinable to the brazing metal on the tip end surface of the projection formed on the ceramic member, and arranging the intermediate member composed of the above material upon the bottom surface of the recess of the metallic member. Graphite is recited as an example of the material not joinable to the brazing metal A graphite film is easily formed on the tip end surface of the projection by coating a suspension liquid of graphite particles thereon through brushing or spraying or immersing the tip end into the suspension. As the intermediate member, a low elasticity member such as sliver, felt, web, web sintered body, or a woven cloth composed of graphite fibers may be used alone or in combination.

The interposition of the intermediate member made of a low elastic material is to prevent joining between the brazing metal and the bottom surface of the recess, prevent relative interference between the tip end surface of the projection and the bottom surface of the recess due to difference in amount of shrinkage between the ceramic member and the metallic member during cooling from the joining temperature to prevent occurrence of excess residual stress upon the joined portion, and effectively permeating the molten brazing metal into the gap between the outer peripheral surface of the projection and the inner peripheral surface of the recess.

According to the first aspect of the present invention, the ceramic member and metallic member are joined together with a brazing metal containing an active metal element which can be chemically joined to the ceramic member. As the brazing metal, use may be made of an alloy containing the above active metal element or a brazing metal material produced by coating an active metal element on a metallic substrate. Further, as the brazing metal, a foil of an active metal may be used in combination with a brazing metal containing no active metal. When easy adjustment of an addition amount of the active metal to the brazing metal, and easy handling and easy production of the brazing metal are taken into consideration, the brazing metal having a structure in which the active metal element is coated on the metallic substrate is preferably used. It is more preferable to use a brazing metal in which an active metal element is vapor deposited onto a metallic substrate. When the ceramic member to be joined is a ceramic containing at least a nitride or a carbide, the active metal element is preferably at least one kind of metal element selected from the group consisting essentially of Zr, Ti, Ta, Hf, V, Cr, La, Sc, Y and Mo. When the ceramic member to be joined is an oxide type ceramic, the active metal element is preferably at least one kind of metal elements selected from the group consisting essentially of Be, Zr and Ti.

A ceramic material constituting the metal-ceramic joined composite body according to the first aspect of the present invention may be any ceramic material so long as it can exhibit high strength joining between the above active brazing metal and the ceramic material. From the standpoint of the practical application, the ceramic material is preferably at least one kind of ceramic material selected from the group consisting essentially of silicon nitride, silicon carbide, sialon, zirconia, alumina, mullite, aluminum titanate and cordierite. The selection of the ceramic materials to be used may be effected depending upon the use or purpose of the metal-ceramic joined composite body and the kind of the metallic material to be joined to the ceramic member.

Since the above active brazing metal has good wettability to the ceramic member, there is no need to perform a special pretreatment such as a metallizing for the ceramic member. Further, if the metallic member is plated with Ni, wettability is improved. Therefore, when such a brazing metal is used, the molten brazing metal can be impregnated into the joining position by utilizing a capillary action. Thus, brazing with less defects can be effected merely by controlling a gap formed at a portion to be joined. The upper limit of the gap at the brazing temperature is preferably not more than 300 μm, and more preferably not more than 150 μm. If the gap is more than 300 μm, a desired joining distance cannot be assured because the brazing metal-rising level decreases.

According to the metal-ceramic composite body of the first aspect of the present invention, residual stress at the joining end varies in proportion to the joining distance. However, the joining distance L necessary for restraining the residual stress of the ceramic to the failure stress depends upon physical properties of the ceramic member or the diameter D of the projection thereof. For instance, when the ceramic member is made of silicon nitride, the ratio (L/D) between the joining distance (L) and the diameter (D) of the projection is preferably set in a range from 0.2 to 0.8, and more preferably in a range from 0.2 to 0.6, and most preferably in a range from 0.2 to 0.4. If the above L/D is unfavorably less than 0.2, the joining distance is so short that it is feared that the joining strength becomes insufficient. On the other hand, if it is more than 0.8, residual stress occurring at the joining end becomes so large that the ceramic member is likely to break.

In the above-mentioned structure according to the second aspect of the present invention, the joining between the metallic member and the ceramic member is limited to joining between the outer peripheral surface of the projection of the ceramic member and the inner peripheral surface of the recess of the metallic member, and the surface of the tip end of the projection of the ceramic member is prevented form being joined to the bottom surface of the recess of the metallic member by providing a space therebetween or interposing the intermediate member made of a low elasticity material not joinable to the brazing metal or the film of such a material therebetween so that stress concentration due to residual stress at the tip end of the projection and the joining end is mitigated. Further, a groove is provided along substantially the entire circumference of the outer periphery of the metallic member such that the joining end may be located at a position corresponding to the groove. Thus, stress concentration due to residual stress occurring at the joining end of the ceramic member is further mitigated, so that high reliability metal-ceramic joined composite body difficult to break in bending or twisting can be obtained.

If the joining position is unfavorably outside the above limitation, stress concentration occurring at the joining end between the members is excessive or sufficient joining strength cannot be obtained. For instance, if the brazing metal joining is effected over the entire contact zone between the outer surface of the projection and the inner surface of the recess, it is feared that the ceramic member may break at the joining end due to residual stress resulting from difference in thermal expansion between the ceramic member and the brazing metal or between the ceramic member and the metallic member during cooling from the joining temperature.

Since the metal-ceramic joined composite bodies in the second aspect of the present invention are used at high temperatures in most cases, even if the joining is effected at room temperature, for instance, by press fitting, the problem of the residual stress due to mutual interference between the projection and the recess resulting from the above difference in thermal expansion cannot be avoided.

To the contrary, when the joining is effected by brazing in the second aspect of the present invention, brazing is performed at the contact zone between the outer peripheral surface of the projection and the inner peripheral surface of the recess of the metallic member only. Thus, residual stress occurring at the joining end can be mitigated. Further, since the firm joined portion is formed between the ceramic member and the metallic member through a reaction among the brazing metal, the ceramic member, and the metallic member, the joining strength in a range from room temperature to high temperatures not only the increases, but also shrinkage fitting effect can be additionally obtained during cooling from the joining temperature. Thus, high strength can stably be obtained.

The joining portion is limited to the above location by forming, on the surface of the tip end of the projection formed on the ceramic member, a thin film made of a material having no joinability to the brazing metal, by providing a space between the bottom surface of the recess formed in the metallic member and the surface of the tip end of the projection formed on the ceramic member, interposing the intermediate member made of the above material therebetween, or by a combination thereof.

As an example of the material having no joinability to the brazing metal, graphite may be recited. The graphite film may easily be formed on the surface of the tip end of the projection by applying a suspension liquid of graphite particles thereon through brushing, spraying, or immersing. As the intermediate member, a low elasticity member such as sliver, felt, web, web sintered body, woven cloth, etc. made of graphite fibers may be used singly or in combination.

When the above intermediate member is interposed between the surface of the tip end of the projection and the bottom surface of the recess, the joining position can easily and assuredly be limited. Consequently, residual stress occurring at the joining end of the ceramic member after the joining can be reduced and controlled so that the joining strength can be increased and variations thereof can be reduced.

The interposition of the intermediate member made of the low elasticity material is to interrupt the joining between the brazing metal and the bottom surface of the recess, to prevent mutual interference between the tip end of the projection and the bottom surface of the recess due to difference in shrink amount between the ceramic member and the metallic member during the cooling from the joining temperature, to prevent occurrence of excessive residual stress at the joining portion, and to effectively permeate the molten brazing metal into the gap between the outer peripheral surface of the projection and the inner peripheral surface of the recess.

In the second aspect of the present invention, when the joining is to be effected by brazing, the ceramic member and the metallic member are preferably joined with an active brazing metal containing an active metal element capable of chemically joining to the ceramic member. As the brazing metal, use may be made of an alloy containing an active metal element or a brazing metal in which an active metal element is coated on a metal substrate. Further, as the metal, a foil of an active metal may be used in combination with a brazing metal containing no active metal. When easy control of the addition amount of the active metal to the brazing metal, easy handling and production thereof are taken into consideration, use of the brazing metal having the active metal element coated on the metal substrate is preferred. More preferably, a brazing metal having an active metal element vapor deposited onto a metal substrate is used. As to the active metal element, at least one kind of metallic element selected from the group consisting essentially of Zr, Ti, Ta, Hf, V, Cr, La, Sc, Y and Mo is preferred when the ceramic member to be joined contains at least a nitride and/or a carbide. When the ceramic member to be joined is an oxide type ceramic, at least one kind of metal element selected from the group consisting essentially of Be, Zr and Ti is preferred.

Since the active brazing metal has good wettability to the ceramic, there is no need to effect a special pretreatment such as metallizing upon the ceramic member. Further, wettability is improved by plating the metal substrate with Ni. Therefore, when this brazing metal is used, the molten brazing metal can be impregnated to a desired position to be brazed through utilizing a capillary action thereof. Thus, brazing accompanied by fewer bubbles or shrinkage cavities can be performed merely by controlling the gap formed at the position to be joined without arranging the brazing metal at the position to be brazed. The upper limit of the thickness of the gap at the brazing temperature is preferably not more than 300 $\mu$m, and more preferably not more than 150 $\mu$m. If the gap is greater than 300 $\mu$m, the rising height of the brazing metal decreases and the intended joining distance cannot be obtained.

Even when brazing is performed with a brazing metal containing no active metal, the same effects as in the brazing with the above brazing metal containing the active metal can be obtained by forming a metallizing layer on a surface of the outer peripheral surface of the projection of the ceramic member to be joined, and plating the metallizing layer with Ni, and further preferably plating Ni on a portion of the inner peripheral surface of the recess of the metallic member to be joined.

When the joining is effected by press fitting, shrinkage fitting or expansion fitting in the second aspect of the present invention, a brazing step is preferably omitted to simplify the producing steps. For instance, the joining is effected by press fitting as shown in Japanese Patent Application No. 61-28,594. That is, when a ceramic member and a metallic member are placed in a vessel, and are press fitted together under a reduced pressure of, for instance, around 10 Torr, no compressed air remains in a space between a tip end of the projection of the ceramic member and a bottom surface of the recess of the metallic member so that a joined composite body having high reliability can preferably be obtained.

Further, in order to position the joining end at a location corresponding to the groove formed in the outer peripheral surface of the recessed portion of the metallic member in the case of the brazing according to the second aspect of the present invention, a portion of the inner peripheral surface of the recess of the metallic member to be joined is plated with Ni, or graphite is coated onto one or both of the outer peripheral surface of the projection of the ceramic member and the inner peripheral surface of the recess of the metallic member inside the above location, or the gap between the outer peripheral surface of the projection and the inner peripheral surface of the recess is enlarged to prevent the brazing metal from rising above the desired height due to its capillary action.

When the brazing is effected with a brazing metal containing no active metal, the joining end can be located at the desired position by providing a metallizing layer at a portion of the outer peripheral surface of the projection of the ceramic member to be joined, according to an ordinary method, plating the metallizing layer with Ni, and effecting brazing. This case is more preferable, because the joining is not effected due to no reaction between the brazing metal and the ceramic at a tip end surface of the projection where no metallizing layer is formed, and a space is formed between the surface of the tip end of the projection and the bottom surface of the recess. Further, wettability is further improved between the inner peripheral surface and the brazing metal by plating Ni on a portion of the inner peripheral surface of the recess of the metallic member to be joined. The brazing may be effected while a foil of an active metal is arranged at a portion of the outer peripheral surface of the projection of the ceramic member and a brazing metal containing no active metal is arranged between the tip end surface of the projection and the bottom surface of the recess of the metallic member.

In the case of the press fitting, a desired space can be formed between the surface of the tip end of the projection and the bottom surface of the recess by controlling a press fitting distance, and the joining end can easily be positioned at a desired location by outwardly enlarging the inner peripheral surface of the recess of the metallic member from the joining end to the side of the ceramic member.

The above-mentioned groove may be formed before or after the joining between the projection of the ceramic member and the recess of the metallic member. Preferably, the groove is formed posterior to the joining, because, the metallic member must often be finished to a desired dimension due to its deformation during the joining. That is, the provision of the groove after the joining is preferred, because the groove can be formed during the finish working of the metallic member after the joining.

As the ceramic material constituting the metal-ceramic joined composite body according to the second aspect of the present invention, any ceramic material may be used. When practical applicability is taken into consideration, at least one kind of ceramic material selected from the group consisting essentially of silicon nitride, silicon carbide, sialon, zirconia, alumina, mullite, aluminum titanate, and cordierite is preferably used. Which ceramic material should be used has only to be determined depending upon use purpose of the metal-ceramic joined composite body according to the present invention and the kind of the metallic material to be joined thereto.

Further, when the groove is formed at the outer peripheral surface of the recessed portion of the metallic member corresponding to the joining end, stress concentration due to residual stress occurring at the joining end of the ceramic member can be more effectively mitigated at or near room temperature giving greater difference in thermal expansion.

Furthermore, when the difference between the diameter of the bottom of the groove and the outer diameter of the projection of the ceramic member is preferably from 0.05 to 0.8 times, more preferably from 0.1 to 0.6 times, that between the outer diameter of the metallic member at the recessed portion and the outer diameter of the projection of the ceramic member, stress concentration occurring at the joining end of the ceramic member can further be mitigated.

In the structure according to the third aspect of the present invention, since the brazing metal is not firmly fixed to the projection of the ceramic member at at least the joining end of the joined portion through chemical joining, tensile stress concentration upon the joining end of the ceramic member due to difference in thermal expansion between the metallic member or the brazing metal and the ceramic member is mitigated, so that resistance of the joined composite body against bending or twisting increases to enhance reliability. Further, since a soft metal such as the brazing metal is present between the projection of the ceramic member and the recess of the metallic member, the effect due to the buffer material can be obtained. Furthermore, since the brazing metal is also interposed outside the joining interface at which the ceramic member is chemically bonded to the metallic member, corrosive gases can be prevented from entering the joining interface at which the chemical joining is formed.

Furthermore, in the case of the joined composite body in which the brazing metal at the joined portion is not firmly fixed to the entire outer peripheral surface of the projection of the ceramic member through chemical joining, since bending strength is highest as shown later in specific Examples, such a joined composite body can favorably be applied as parts undergoing bending loads, such as turbocharger rotors.

However, in the case of the joined body in which the entire outer peripheral surface of the projection is not fixed with the brazing metal through the chemical joining, if the temperature of the whole joined portion is higher than that of the joined portion of a turbocharger rotor, for instance, the former reaches 600° C., the shrinkage fitting effect decreases due to difference in thermal expansion between the ceramic member and the metallic member. Thus, it is feared that the joining strength is lower.

That the brazing metal is not firmly fixed to the ceramic member through chemical joining means that the brazing metal merely contacts with the ceramic member, that the brazing metal is not chemically firmly fixed to the ceramic member at their contacting interface, and that the brazing metal merely mechanically tightens the ceramic member through the solder. The joining end means an end of the joined portion at which the ceramic member contacts with the brazing metal near the opening of the recess.

Firm fixing between the brazing metal and the ceramic member at the joining end of the above joined portion through chemically joining can be avoided as follows:

When the brazing is effected by using the active brazing metal, the firm fixing can be avoided by forming a thin layer of a material having no joinability to the brazing metal onto the outer peripheral surface of the projection formed on the ceramic member at a position corresponding to the joining end. When the brazing is effected by using the brazing metal containing no active metal, the firm fixing can be avoided by forming the metallizing layer on the outer peripheral surface of the projection formed on the ceramic member excluding a portion of the projection corresponding to the joining end while no metallizing layer is formed on this portion of the projection. Ni is preferably plated on the recess of the metallic member to improve wettability of the recess to the brazing metal.

Further, since the joining between the metallic member and the ceramic member is limited to the location between the outer peripheral surface of the projection of the ceramic member and the inner peripheral surface of the recess of the metallic member, and the joining or contacting between the surface of the tip end of the projection of the ceramic member and the bottom surface of the recess of the metallic member is prevented by providing a space between the end tip surface and the bottom surface or interposing the low elasticity intermediate material having no joinability to the brazing metal or the film composed of such a material therebetween, stress concentration at the tip end of the projection and the joining end of the ceramic member due to residual stress is mitigated, and firm fixing is not effected at the above joining end by chemical joining. Thus, the high reliability metal-ceramic joined composite body resistant to breakage in bending or twisting can be obtained.

Since the outer peripheral surface of the projection and the inner peripheral surface of the recess of the metallic member are brazed only at the contact portion therebetween, and the brazing metal and the ceramic member are not firmly fixed at the joining end, residual stress occurring at the joining end can be mitigated. Further, since the ceramic member and the metallic member are firmly fixed to each other through chemical joining at the joined portion except for the joining end, the firmly joined portion is formed between the members to enhance strength in a temperature range between room temperature and high temperatures. In addition, since the shrinkage fitting effect is additionall favorably exhibited during cooling from the joining temperature, high strength can stably be obtained.

The joined portion is limited to the above-mentioned position by forming a thin film made of a material having no joinability to the brazing metal onto the surface of the tip end of the ceramic member or by providing an intermediate member made of such a material or space between the bottom surface of the recess formed in the metallic member and the surface of the tip end of the projection of the ceramic member, or by a combination thereof.

In the above, the outer peripheral surface of the projection means the outer peripheral surface of the projection excluding the surface of the tip end thereof, while the outer surface means the entire outer surface of the projection including the surface of the tip end of the projection. In the same manner, the inner peripheral surface of the recess means the inner peripheral surface of the recess excluding the bottom surface, while the inner surface of the recess means the entire inner surface of the recess including the bottom surface thereof.

In the structure according to the fourth aspect of the present invention, when the space or the low elasticity intermediate member of the material not joinable to the brazing metal is provided in a thickness G which is determined by the metal, the ceramic and the brazing metal used, mutual interference between the surface of the tip end of the projection of the ceramic member and the bottom surface of the recess of the metallic member due to difference in thermal expansion between the ceramic member and the metallic member can be prevented, and stress concentration at the joining end in the joining interface between the ceramic member and the metallic member is reduced. As a result, high reliability joined composite body having satisfactory resistance against bending and twisting can be obtained. The reason why the thickness G is not less than $(\alpha-\alpha')\times(T_S-T_R)\times L_1$ is that when the space or the intermediate member having the thickness greater than possible difference in amount of shrinkage between the metallic member and the ceramic member due to difference in thermal expansion therebetween during cooling after the brazing is provided, the direct contacting and mutual interference between the bottom surface of the recess of the metallic member and the surface of the tip end of the projection of the ceramic member can be avoided.

This thickness G of the space or the intermediate member has only to be assured at the solidifying temperature of the brazing metal at the time of the brazing. Further, since it is difficult to control the thickness, the thickness G is preferably a thickness after the cooling following the brazing. Further, the thickness G of the intermediate member may be a thickness at room temperature before the joining. In this case, high reliability joined composite bodies having great joining strength can easily be mass-produced by controlling the thickness.

In order to braze the outer peripheral surface of the projection formed on the ceramic member and the inner peripheral surface of the recess formed in the metallic member as the joined portion while the space or the intermediate member made of the material having no joinability to the brazing metal is provided between the surface of the tip end of the projection and the bottom surface of the recess, a thin film made of the material having no joinability to the brazing metal is formed on the surface of the tip end of the projection, or the intermediate member made of this material is arranged between the bottom surface of the recess and the surface of the tip end of the projection, or a combination thereof is employed.

In the structure of the fifth aspect of the present invention, when the brazing metal is provided between the recess of the metallic member and the projection of the ceramic member beyond the outward enlargement-starting position of the recess of the metallic member, the influence due to thermal shrinkage of the brazing during cooling from the joining temperature can be reduced, and stress concentration occurring in the ceramic member can be suppressed to a lower level. When the brazing metal is provided such that its thickness beyond the diameter enlargement-starting position of the recess gradually decreases toward the opening of the recess, stress concentration occurring in the ceramic member due to difference in thermal expansion between the ceramic member and the metallic member or the brazing metal can be reduced.

Further, since the space or the low elasticity intermediate member made of a material not joinable to the brazing metal is provided between the tip end surface of the projection of the ceramic member and the bottom surface of the recess of the metallic member, joining between the tip end surface of the projection of the ceramic member and the bottom surface of the recess of the metallic member through the brazing metal can be prevented. In addition, mutual interference occurring between the tip end surface of the projection and the bottom surface of the recess due to difference in amount of shrinkage between the ceramic member and the metallic member during cooling from the joining temperature can be prevented, so that occurrence of excess residual stress at the joined portion can be prevented. Stress concentration at the tip end and joining end of the projection of the ceramic member can be mitigated. The stress concentration at the joined portion of the metal-ceramic joined composite body due to residual stress can greatly be mitigated by combining the above-mentioned effects. Thus, high reliability metal-ceramic joined composite body difficult to break in bending or twisting can be obtained.

As the metallic material constituting the metal-ceramic composite body according to the present invention, a metallic material having a coefficient of thermal expansion near that of the ceramic material used is preferably selected. Particularly, as the metallic material to be joined to the ceramic material having excellent strength at high temperatures, for instance, silicon nitride, silicon carbide, sialon, etc., Incoloy 903 (trade name), Incoloy 909 (trade name), Koval (trade name) or the like is preferably selected. When the metal-ceramic joined composite body according to the present invention is applied as a rotary shaft, such as a turbocharger rotor, rotating at high speeds at high temperatures, Incoloy 903 or Incoloy 909 which has a higher strength than that of Koval is preferably selected as the metallic material. In Table 1, coefficient of thermal expansion of carbon steel and SNCM 439 (JIS) as ordinary metallic materials, as well as coefficients of thermal expansion and tensile strength of Incoloy 903, Incoloy 909 and Koval are shown in Table 1.

TABLE 1

| Metallic material | Coefficient of thermal expansion (room temperature~500° C.) 1/°C. | Tensile strength (kg/mm$^2$) |
|---|---|---|
| Incoloy 903 | $8.0 \times 10^{-6}$ | 110 |
| Incoloy 909 | $8.0 \times 10^{-6}$ | 105 |
| Koval | $6.0 \times 10^{-6}$ | 70 |
| Carbon steel | $14 \times 10^{-6}$ | — |
| SNCM 439 | $14 \times 10^{-6}$ | — |

These and other objects, features, and advantages of the invention will be appreciated upon reading the following description of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a partially cross sectional schematic view of a metal-ceramic joined composite body having a projection formed on a ceramic member joined to a recess formed in a metallic member, used for calculating residual stress occurring at a joined portion;

FIG. 2 is a diagram illustrating the relationship between a joining distance and residual stress occurring at a joining end when the metallic member is joined to the ceramic member between the outer peripheral surface of the projection and the inner peripheral surface of the recess;

FIG. 3 is a partially sectional view of the joining structure of an embodiment of the metal-ceramic joined composite body according to the first aspect of the present invention;

FIG. 4 is a partially sectional view of the joining structure of another embodiment of the metal-ceramic joined composite body according to the first aspect of the present invention;

FIGS. 5, 6 and 7 are partially sectional views of embodiments of the metal-ceramic joined composite bodies according to the second aspect of the present invention;

FIGS. 8a and 8b are diagrams illustrating the relationship between X [=(D−Dc)/(Dm−Dc)] and the pullout load at break or the twisting torque with respect to metal-ceramic joined composite bodies of the second aspect of the present invention, respectively;

FIG. 9 is a partially sectional view of an embodiment in which the metal-ceramic joined composite body according to the second aspect of the present invention is embodied in a turbocharger turbine rotor;

FIG. 10 is a partially sectional view of Comparative Example 1;

FIG. 11 is a schematic view illustrating a bending test device used for bending tests;

FIGS. 12a and 12b are partially sectional views of embodiments of the metal-ceramic joined composite bodies according to the third aspect of the present invention, and FIG. 12c being a partially sectional view of a metal-ceramic joined composite body as a comparative example;

FIG. 14 is a diagram showing results in bending load test with respect to metal-ceramic joined composite bodies of the third aspect of the present invention;

FIG. 15 is a partially sectional view of a metal-ceramic joined composite body as a comparative example;

FIG. 16 is a diagram showing results in bending load tests with respect to metal-ceramic joined composite bodies according to the fourth aspect of the present invention;

FIGS. 17a through 17c are partially sectional views of embodiments of the metal-ceramic joined composite bodies according to the fifth aspect of the present invention;

FIGS. 18a and 18b are enlarged sectional views of portions of the metal-ceramic joined composite bodies in the vicinity of outward enlargement-starting positions, respectively; and FIGS. 19a and 19b are partially sectional views of metal-ceramic joined composite bodies as comparative examples.

DETAILED DESCRIPTION OF THE PREFERRED EMBODIMENTS

Figure 13A:
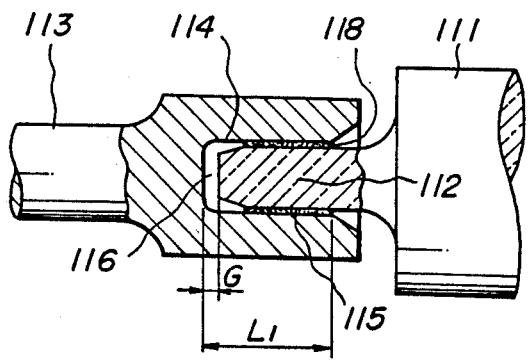
FIGS. 13a and 13b are partially sectional views of further embodiments of the metal-ceramic joined composite bodies according to the fourth aspect of the present invention.

Next, the present invention will be explained in more detail with reference to the attached drawings.

FIGS. 1 through 4 are to illustrate the first aspect of the present invention.

FIG. 1 is a partially sectional schematic view of a joined composite body used for determining residual stress occurring at a joined portion according to a finite element method analysis. In FIG. 1, a part of an outer peripheral surface of a projection 2 formed on a ceramic member 1 is joined to a part of an inner peripheral surface of a recess 5 formed in a metallic member 4 over a joining distance L. Joined composite bodies as shown in FIG. 1 were cooled from the solidifying temperature of a brazing metal to room temperature, and how residual stress occurring at a joining end 7 varied depending upon the relation between the surface 3 of a tip end of the projection and a bottom surface 6 of the recess was determined by calculation. Calculation results are shown in Table 2. No. 1 gives a calculation result of a test sample in which the bottom surface 6 of the recess was not joined to the surface 3 of the tip end of the projection and their mutual interference was prevented by providing a space of a given length therebetween. No. 2 gives a calculation result of a test sample in which the bottom surface 6 of the recess was not joined to the surface 3 of the tip end of the projection but closely contacted therewith. No. 3 corresponds to a case where the bottom surface 6 of the recess was joined to the surface 3 of the tip end of the projection. As is clear from Table 2, residual stress was the smallest in No. 1.

TABLE 2

| No. | Relation between tip end surface of projection and bottom surface of recess | | Maximum stress occurring at joining end (kg/mm$^2$) |
|---|---|---|---|
| | joining | gap | |
| 1 | not joined | present | 30 |
| 2 | not joined | no gap | 49 |
| 3 | joined | no gap | 56 |

Diameter of projection of ceramic member: 12 mm
Joining distance: 4.5 mm

Next, while a given space was provided between the tip end surface 3 of the projection and the bottom surface 6 of the recess in the joined composite body as shown in FIG. 1, the joining distance L between the outer peripheral surface of the projection and the inner peripheral surface of the recess was varied. FIG. 2 shows the relationship between the joining distance L and calculation values of the residual stress occurring at the joining end 7. As is clear from FIG. 2, the residual stress increases with increase in the joining distance L.

The allowable value of the residual stress may be set depending upon strength of a ceramic material used. When strength of the ceramic materials now available and the safety factor are taken into consideration, it is preferably set at not more than 50 kg/mm$^2$, and more preferably not more than 40 kg/mm$^2$.

A space to be provided between the surface 3 of the tip end of the projection and the bottom surface 6 of the recess in the joined composite body shown in FIG. 1 is set at such a size (G) that no mutual interference will not occur between the bottom surface 6 of the recess and the tip end surface 3 of the projection during cooling from a solidifying temperature to room temperature. Therefore, the space has only to be set to meet the following relationship.

G > (distance from joining end 7 to bottom surface 6 of recess of metallic member) × (coefficient of thermal expansion of metallic member − coefficient of thermal expansion of ceramic member) × (brazing metal solidifying temperature − room temperature)

The above space is provided to prevent mutual interference between the bottom surface 6 of the recess and the tip end surface 3 of the projection. Further, in the space may be arranged a buffer member of a low elasticity material between the bottom surface of the recess and the tip end surface as an intermediate member. As such a low elasticity material, a sliver, a felt, a web, a web sintered body, or a woven cloth made of graphite fibers may be used.

In the following, the first aspect of the present invention will be explained with reference to specific Examples.

EXPERIMENT 1

A metallic member having a recess at one end and a thin shaft portion was prepared from a round bar of a solution-treated Incoloy 903 having a diameter of 18 mm. The recess had an inner diameter of 11.05 mm and a depth of 8 mm, and the thin shaft portion had a diameter of 12 mm. A ceramic member was prepared from a silicon nitride sintered body obtained by pressureless sintering. The ceramic member had a projection of 11.0 mm in diameter and 10 mm in length at one end. A corner of the bottom of the recess was beveled at 0.2 C., and a corner of an opening end of the recess was tapered. An edge portion of a tip end of the projection was similarly tapered at 0.5 C., and its base portion was rounded at R2. After the inner peripheral surface of the recess was plated with Ni in a thickness of 10 μm, a graphite felt of 0.4 mm thick was arranged on the bottom surface of the recess. Then, upon the graphite felt was arranged an active brazing metal in which 2 μm thick Ti was vapor deposited onto a filmy Ag-Cu brazing alloy of 0.1 mm in thickness. On the other hand, after graphite was coated onto the tip end surface of the projection, the projection was inserted into the recess of the metallic member, thereby forming a joining assembly. Next, the joining assembly was brazed by heating it to 850° C. in vacuum, which was then subjected to aging treatment specified for Incoloy 903. Thereby, a joined composite body having a joining structure as shown in FIG. 3 was obtained (hereinafter referred to as Example according to the present invention).

Comparative Example was prepared in the following manner.

A metallic member and a ceramic member as obtained above were used, and Ni was plated onto a bottom surface of a recess of the metallic member only. Then, both the members were brazed with the same active brazing metal as in the brazing of the above joined composite body while no graphite felt was arranged onto the bottom surface of the recess and no graphite was coated on the tip end surface of the projection. Then, the above thermal treatment as in the above joined composite body was effected, thereby preparing a joined composite body having a joined structure as shown in FIG. 1.

With respect to those two kinds of the joined composite bodies, a joined portion was cut and a brazed state was compared. As a result, it was revealed that the ceramic member and the metallic member were joined between the outer peripheral surface 18 of the projection of the ceramic member and the inner peripherals surface 19 over a joining distance of 4.5 mm in Example according to the present invention, while the joining was effected between the tip end surface 3 of the projection and the bottom surface 6 of the recess in Comparative Example.

Next, a twisting strength test and a pullout test were carried out at 450° C. with respect to each of these two kinds of the joined composite bodies. Results obtained are shown in Table 3. As is clear from the results in Table 3, the joined composite bodies according to the present invention in which the outer peripheral surface of the projection of the ceramic member was joined to the inner peripheral surface of the recess of the metallic member had higher joining strength than comparative joined composite bodies in which the tip end of the ceramic shaft was joined to the bottom surface of the recess of the metallic member.

TABLE 3

|  | No. | Joining position of projection of ceramic member | Twisting torque (kg · m) | Pullout load (kg) |
|---|---|---|---|---|
| Present invention | 1 | outer periphery | 7.9 | — |
|  | 2 | outer periphery | 7.2 | — |
|  | 3 | outer periphery | 6.8 | — |
|  | 4 | outer periphery | — | 1,460 |
|  | 5 | outer periphery | — | 1,500 |
|  | 6 | outer periphery | — | 1,230 |
| Comparative Example | 101 | tip end | 3.8 | — |
|  | 102 | " | 3.6 | — |
|  | 103 | " | 3.4 | — |
|  | 104 | " | — | 597 |
|  | 105 | " | — | 570 |
|  | 106 | " | — | 450 |

Testing temperature: 450° C.
Diameter of projection of ceramic member: 11 mm

EXPERIMENT 2

By using a normal Ag-Cu brazing alloy, joined composite bodies (comparative example) each having the same dimension as that of the joined composite body described in Experiment 1 were formed. With respect to the joined composite bodies of the comparative example, a joined portion was cut and a brazed state was observed. As a result of the observation with respect to the comparative example, the Ag-Cu brazing alloy was penetrated between the outer peripheral surface 18 of the projection of the ceramic member and the inner peripheral surface 19 of the metallic member, and the brazing was joined to the metallic member. On the other hand, the Ag-Cu brazing alloy was not joined to the ceramic member made of silicon nitride. As clearly understood from the above, the joining between the ceramic member and the metallic member in comparative examples was assumed to be effected by the shrinkage fitting therebetween via the Ag-Cu brazing alloy.

Next, with respect to the comparative examples and the examples according to the present invention described in the Experiment 1, twisting torques and pullout loads of the joining portions were compared in a testing temperature range of 450° C.~750° C., and results shown in Table 4 were obtained. As clearly understood from the Table 4, the joined composite body according to the invention has the stronger joining strength in high temperatures above 600° C. than that of the comparative example. This is because the joined composite body according to the invention has the structure that the metallic member and the ceramic member were joined integrally by the brazing metal. In the comparative example, since the joining therebetween is performed by the shrinkage fitting, a shrinkage amount becomes smaller corresponding to an increase of temperature, and also the joining strength is abruptly decreased.

TABLE 4

| Test item (unit) | Test sample | Testing temperature | | | | |
|---|---|---|---|---|---|---|
| | | 450° C. | 600° C. | 650° C. | 700° C. | 750° C. |
| Twisting torque (kg·m) | Example | 6.9 | 5.6 | 3.4 | 3.0 | 1.3 |
| | Comparative Example | 6.1 | 3.0 | — | 1.2 | — |
| Pullout load (kg) | Example | 1,348 | 705 | 670 | 430 | 350 |
| | Comparative Example | 1,260 | 560 | — | 270 | — |

Diameter of projection of ceramic member: 11 mm

EXPERIMENT 3

A turbine rotor having a shaft portion and a turbine wheel 21 integrally formed therewith was prepared from a silicon nitride sintered body obtained by pressureless sintering. The turbine rotor had a projection 22 of 12.0 mm in diameter and 7.5 mm in length at one end. A metallic bar was prepared from a round bar of a solution-treated Incoloy 903 having a diameter of 20 mm, one end of which was friction-welded to an alloy steel having a diameter of 12 mm such as JIS-SNCM439. Then, an end of the alloy steel was machined into a necessary diameter for a turbocharger rotor, and a recess 25 having an inner diameter of 12.05 mm and a depth of 7.0 mm was arranged at an end of the round bar made of Incoloy 903. After the inner peripheral surface of the recess was plated with Ni, the joining was effected by the same method as that of Experiment 1 so as to obtain a joined composite body for the turbocharger rotor having a joining portion shown in FIG. 4. With respect to the joined composite body, a finish working was performed so as to obtain a turbine rotor for the turbocharger rotor. Then, the turbine rotor thus obtained was installed in a gasoline engine having a piston displacement of 2,000 cc, and a rotation test was performed under a condition of 120,000 rpm during 200 hours. After that, a twisting torque test for the joining portion was effected, and strengths before and after the rotation test were compared. As a result, the turbine rotor does not show a decrease of the joining strength.

FIGS. 5 through 10 are to illustrate the second aspect of the present invention.

FIG. 5, FIG. 6 and FIG. 7 are partially sectional schematic views of a metal-ceramic joined composite body according to the invention, respectively.

In FIG. 5, a projection 52 of a ceramic member 51 is joined to a recess 55 of a metallic member 54 having a groove 53 at its outer peripheral surface by a brazing method. After the joining, an active brazing metal 58 is arranged over all the connecting surface between an outer peripheral surface 56 of the projection of the ceramic member 51 and an inner peripheral surface 57 of the recess of the metallic member 54, and a joining end 59 is positioned corresponding to the groove 53. Moreover, a space 62 is arranged between a tip end surface 60 of the projection of the ceramic member 51 and a bottom surface 61 of the recess of the metallic member 54.

Further, in the embodiment illustrated in FIG. 6, a graphite felt 63 which is a low elasticity intermediate member made of a material not joinable to a brazing metal is arranged between the tip end surface 60 of the projection of the ceramic member 51 and the bottom surface 61 of the recess of the metallic member 54, and the other structures are the same as those of the embodiment shown in FIG. 5.

Moreover, in the embodiment illustrated in FIG. 7, the projection 52 of the ceramic member 51 is joined to the recess 55 of the metallic member 54 having the groove 53 at its outer peripheral surface by a press fitting. After the joining, the joining end 59 is positioned corresponding to the groove 53, and the space 62 is arranged between the tip end surface 60 of the ceramic member 51 and the bottom surface 61 of the recess of the metallic member 54 by controlling the press fitting length.

Hereinafter, experiments according to the second aspect of the invention will be explained.

EXPERIMENT 4

A metallic member 54 having a recess 55 at one end and a shaft portion was prepared from a round bar of a solution-treated Incoloy 903 having a diameter of 18 mm. The recess had an inner diameter of 11.05 mm and a depth of 8 mm and a groove 53 at its peripheral outer surface. The thin shaft portion had a diameter of 12 mm. A ceramic member 51 was prepared from a silicon nitride sintered body obtained by pressureless sintering. The ceramic member had a projection 52 of 11.0 mm in diameter and 10 mm in length at one end. A corner of the bottom of the recess 55 was beveled at 0.2 ° C., and a corner of an opening end of the recess 55 was tapered. An edge portion of a tip end of the projection 52 was similarly tapered at 0.5 ° C., and its base portion was rounded at R2. After the inner peripheral surface of the recess 55 was plated with Ni in a thickness of 10 μm, a graphite felt of 0.4 mm thick was arranged on the bottom surface 61 of the recess. Then, upon the graphite felt 63 was arranged an active brazing metal in which 2 μm thick Ti was vapor deposited onto a film Ag-Cu brazing alloy of 0.1 mm in thickness. On the other hand, after graphite was coated onto the tip end surface 60 of the projection, the projection 52 was inserted into the recess 55 of the metallic member 54, thereby forming a joining assembly. In this case, a joining end 59 between an outer peripheral surface 56 of the projection and an inner peripheral surface 57 of the recess was set at a position corresponding to the groove 53, by arranging the Ni plating of 10 μm thick on the inner peripheral surface of the metallic member 54 from the bottom surface 61 of the recess to the joining end portion. Next, the joining assembly was brazed by heating it to 850° C. in vacuum, which was then subjected to aging treatment specified for Incoloy 903. Thereby, a joined composite body having a joining structure as shown in FIG. 6 was obtained (hereinafter referred to examples according to the present invention).

Comparative Example 1 was prepared in the following manner.

A metallic member and a ceramic member of the Experiment 4 as obtained above were used, and Ni was plated onto all the inner surface of a recess of the metallic member. Then, both the members were brazed with the same active brazing metal as in the brazing of the above joined composite body, while no graphite felt was arranged onto the bottom surface of the recess and no graphite was coated on the tip end surface of the projection. Then, the above thermal treatment as in the above joined composite body was effected, thereby preparing a joined composite body having a joined structure as shown in FIG. 10.

With respect to these two kinds of the joined composite bodies of the Experiment 4 and the Comparative Example 1, a joined portion was cut and a brazed state was compared. As a result, it was revealed that the ceramic member and the metallic member were joined between the outer peripheral surface 56 of the projection of the ceramic member and the inner peripheral surface 57 over a joining distance of 4.5 mm in Example of Experiment 4 according to the present invention, while the joining was effected between the outer peripheral surface 56 of the projection and the inner peripheral surface 57 of the recess and between the tip end surface 60 of the projection and the bottom surface 61 of the recess in Comparative Example 1.

Next, in order to detect an influence of the depth of the groove, a twisting torque test and a tensile strength test were carried out at room temperature with respect to each of these two kinds of the joined composite bodies by varying a bottom diameter D of the groove. Results obtained are shown in Table 5 and FIGS. 8a and 8b. In particular, FIGS. 8a and 8b show the results with respect to the joined composite body of the Experiment 4. In Table 5 and FIGS. 8a and 8b, X is defined as the following equation so as to evaluate the influence of the depth of the groove, $$X = \frac{D - D_c}{D_m - D_c}$$

wherein $D_c$ is an outer diameter of the projection of the ceramic member and $D_m$ is an outer diameter of the recess of the metallic member. In Table 5 and FIGS. 8a and 8b, X=1.0 shows the joined composite body wherein the groove is not arranged on the outer peripheral surface of the metallic member, and this is a comparative example for the joined composite body wherein the groove is arranged at the joining end of the outer peripheral surface of the metallic member. It should be noted that the comparative examples mentioned above may be broken during preparation for the test of the joined composite body from the joining end of the ceramic member.

TABLE 5

|   |   | Example 4 | | | Comparative Example 1 | |
|---|---|---|---|---|---|---|
| X | No. | Twisting torque (kg · m) | Tensile strength at break (kg) | No. | Twisting torque (kg · m) | Tensile strength at break (kg) |
| 0.03 | 101 | 13.5 | — | | | |
|   | 102 | 12.8 | — | | | |
|   | 103 | — | 2,340 | | — | — |
|   | 104 | — | 2,250 | | | |
|   | average | 13.2 | 2,300 | | | |
| 0.05 | 105 | 14.2 | — | 205 | 3.6 | |
|   | 106 | 14.5 | — | 206 | 3.2 | |
|   | 107 | — | 2,610 | 207 | | 730 |
|   | 108 | — | 2,550 | 208 | | 710 |
|   | average | 14.4 | 2,580 | average | 3.4 | 720 |
| 0.1 | 109 | 15.5 | — | 209 | 3.7 | |
|   | 110 | 15.3 | — | 210 | 4.0 | |
|   | 111 | — | 2,670 | 211 | | 880 |
|   | 112 | — | 2,640 | 212 | | 790 |
|   | average | 15.4 | 2,660 | average | 3.9 | 840 |
| 0.2 | 113 | 15.5 | — | | | |
|   | 114 | 16.0 | — | | | |
|   | 115 | — | 2.610 | | — | — |
|   | 116 | — | 2,550 | | | |
|   | average | 15.8 | 2,580 | | | |
| 0.4 | 117 | 15.8 | — | 217 | 4.7 | |
|   | 118 | 16.1 | — | 218 | 3.9 | |
|   | 119 | — | 2,720 | 219 | | 930 |
|   | 120 | — | 2,690 | 220 | | 860 |
|   | average | 16.0 | 2,710 | average | 4.3 | 900 |
| 0.6 | 121 | 14.9 | — | | | |
|   | 122 | 15.3 | — | | | |
|   | 123 | — | 2,710 | | — | — |
|   | 124 | — | 2,650 | | | |
|   | average | 15.1 | 2,680 | | | |
| 0.8 | 117 | 14.3 | — | 217 | 3.8 | |
|   | 118 | 13.9 | — | 218 | 3.3 | |
|   | 119 | — | 2,490 | 219 | | 790 |
|   | 120 | — | 2,300 | 220 | | 710 |
|   | average | 14.1 | 2,400 | average | 3.6 | 750 |
| 1.0* | 121 | 12.5 | — | 221 | 2.8 | |
|   | 122 | 11.1 | — | 222 | broken during preparation | |
|   | 123 | — | 2,150 | 223 | | 720 |
|   | 124 | — | 2,300 | 224 | | 630 |
|   | average | 11.8 | 2,230 | average | 2.8 | 680 |

*X = 1.0 is outside the scope of the invention

As is clear from the results shown in Table 5 and FIGS. 8a and 8b, in the joined composite body wherein the graphite felt is arranged between the tip end surface of the projection of the ceramic member and the bottom surface of the recess of the metallic member, the joined composite bodies according to the invention wherein the groove is arranged corresponding to the joining end has larger twisting torques and larger tensile strengths at break especially in X=0.05~0.8 than those of the joined composite body of the comparative example wherein no groove is arranged at the position corresponding to the joining end i.e. X=1.0. Moreover, it is preferable to set X=0.1~0.6, because the twisting torque and the tensile strength at break are further improved.

In this case, it is not preferable to set X below 0.03, because a thickness of the groove of the metallic member becomes thinner and thus the strength of the metallic member is decreased.

From the results shown in Table 5, the joined composite member according to the Comparative Example 1 has the smaller twisting torque and the smaller tensile strength at break all over X than those of the joined composite member according to the present invention.

In the above twisting torque test and the tensile strength test at room temperature, both of the example and the comparative example are broken at the joining end on which a stress concentration due to the residual stress in the ceramic member becomes large.

Next, in order to evaluate the joining strength of the metal-ceramic joined composite body in high temperatures, the twisting torque test and the tensile strength test at break were carried out at 450° C. In this case, since the joining strength of the Comparative Example 1 becomes smaller in room temperature and a handling is very difficult in room temperature, a joined composite body having the following structure is used as a Comparative Example 2 for the tests in high temperatures. That is to say, Ni was plated onto a bottom surface of a recess of the metallic member only. Then, both of the members were brazed with the same active brazing metal as in the brazing of the above joined composite body, while no graphite felt was arranged onto the bottom surface of the recess and no graphite was coated on the tip end surface of the projection, thereby preparing a joined composite body as a Comparative Example 2 having a joined structure as shown in FIG. 10.

With respect to the joined composite body of the Comparative Example 2, a joined portion was cut and a brazing metaled state was checked. As a result, it was revealed that the ceramic member and the metallic member were joined between the tip end surface 60 of the projection and the bottom surface 61 of the recess.

With respect to the joined composite bodies of the Experiment 4 and the Comparative Example 2, the twisting torque test and the tensile strength test at break were carried out at 450° C. and results shown in Table 6 were obtained. It should be noted that both of the examples and the comparative examples were broken at a contact surface between the ceramic member and the brazing metal.

TABLE 6

| | | Example 4 | | | Comparative Example 2 | |
|---|---|---|---|---|---|---|
| X | No. | Twisting torque (kg·m) | Tensile strength at break (kg) | No. | Twisting torque (kg·m) | Tensile strength at break (kg) |
| 0.03 | 125 | 7.6 | — | | | |
| | 126 | 7.7 | — | | | |
| | 127 | — | 1,450 | — | — | |
| | 128 | — | 1,360 | | | |
| | average | 7.7 | 1,410 | | | |
| 0.05 | 129 | 8.1 | — | 229 | 3.3 | |
| | 130 | 7.8 | — | 230 | 3.2 | |
| | 131 | — | 1,500 | 231 | | 470 |
| | 132 | — | 1,420 | 232 | | 510 |
| | average | 8.0 | 1,460 | average | 3.3 | 490 |

TABLE 6-continued

| | | Example 4 | | | Comparative Example 2 | |
|---|---|---|---|---|---|---|
| X | No. | Twisting torque (kg·m) | Tensile strength at break (kg) | No. | Twisting torque (kg·m) | Tensile strength at break (kg) |
| 0.1 | 133 | 8.3 | — | 233 | 3.1 | |
| | 134 | 8.4 | — | 234 | 3.4 | |
| | 135 | — | 1,580 | 235 | | 530 |
| | 136 | — | 1,540 | 236 | | 450 |
| | average | 8.4 | 1,560 | average | 3.3 | 490 |
| 0.2 | 137 | 8.6 | — | | | |
| | 138 | 8.6 | — | | | |
| | 139 | — | 1,620 | — | — | — |
| | 140 | — | 1,590 | | | |
| | average | 8.6 | 1,610 | | | |
| 0.4 | 141 | 8.8 | — | 241 | 3.3 | |
| | 142 | 8.5 | — | 242 | 3.4 | |
| | 143 | — | 1,630 | 243 | | 580 |
| | 144 | — | 1,600 | 244 | | 510 |
| | average | 8.7 | 1,620 | average | 3.4 | 550 |
| 0.6 | 145 | 8.6 | — | | | |
| | 146 | 8.3 | — | | | |
| | 147 | — | 1,530 | — | — | — |
| | 148 | — | 1,610 | | | |
| | average | 8.5 | 1,570 | | | |
| 0.8 | 149 | 8.2 | — | 249 | 3.5 | |
| | 150 | 7.7 | — | 250 | 3.5 | |
| | 151 | — | 1,370 | 251 | | 540 |
| | 152 | — | 1,480 | 252 | | 460 |
| | average | 8.0 | 1,430 | average | 3.5 | 500 |
| 1.0* | 153 | 7.9 | — | 253 | 3.6 | |
| | 154 | 7.2 | — | 254 | 3.4 | |
| | 155 | — | 1,460 | 255 | | 570 |
| | 156 | — | 1,230 | 256 | | 450 |
| | average | 7.6 | 1,350 | average | 3.5 | 510 |

*X = 1.0 is outside the scope of the invention

As is clear from the results shown in Table 6, the joined composite bodies according to the invention wherein the outer peripheral surface of the projection of the ceramic member is joined to the inner peripheral surface of the recess of the metallic member have larger joining strengths than those of the Comparative Example 2.

Under the testing condition of 450° C., the residual stress due to a difference of thermal expansion between the ceramic member and the brazing metal or the metallic member becomes relatively low, the effects of the present invention seem to be partially decreased. However, in the temperatures below the solidifying point of the brazing metal, it is apparent that the residual stress is decreased actually.

EXPERIMENT 5

By utilizing the same silicon nitride shown in Experiment 4, a projection 52 of a ceramic member 51 was joined by the press fitting to a recess 55 of the metallic member 54 made of SNCM 439, thereby preparing a joined composite body. Before the press fitting, an outer diameter of the projection 52 is 11.0 mm and an inner diameter of the recess 55 is 10.9 mm. A corner of the bottom of the recess 55 was beveled at 0.2 20 C., and a corner of an opening end of the recess 55 was tapered. An edge portion of a tip end of the projection 52 was similarly tapered at 0.5 ° C., and its base portion was rounded at R2. In this embodiment, the press fitting was performed under a depressed pressure of 10 Torr at 400° C., and the fitting distance was 4.5 mm. After the press fitting, a space 62 between a tip end surface 60 of the projection and a bottom surface of the recess was 0.4 mm. After that, an outer diameter of the recess 55 was finished into 18.0 mm, and a groove 53 was formed around the substantially entire circumference of the outer peripheral surface of the metallic member such that a joining end 59 was located at a position corresponding to the groove, thereby preparing a metal-ceramic joined composite body having a joining structure as shown in FIG. 7.

Moreover, a joined composite body wherein no space 62 was arranged between the tip end surface 60 of the projection and the bottom surface of the recess after the press fitting at 400° C. was prepared for a Comparative Example 3.

Next, in order to evaluate an influence of the depth of the groove, a bending test at room temperature was carried out for the joined composite bodies according to the present invention and the Comparative Example 3 by varying a bottom diameter D of the groove. By using a bending test apparatus disclosed in FIG. 9 of Japanese Patent Laid-open Publication No. 60-103,082 filed by the applicant, the bending test was carried out under the condition that a span is 40 mm and a distance between a fixed end of the joined composite body and an end portion of the metallic body is 15 mm. Results are shown in Table 7. In this Experiment 5, X was defined in the same manner as that of the Experiment 4.

TABLE 7

| | Example 5 | | Comparative Example 3 | |
|---|---|---|---|---|
| X | No. | Failure load in bending (kg) | No. | Failure load in bending (kg) |
| 0.05 | 157 | 110 | 257 | 102 |
| | 158 | 97 | 258 | 87 |
| | average | 104 | average | 95 |
| 0.1 | 159 | 126 | 259 | 108 |
| | 160 | 117 | 260 | 100 |
| | average | 122 | average | 104 |
| 0.4 | 161 | 133 | 261 | 115 |
| | 162 | 123 | 262 | 101 |
| | average | 128 | average | 108 |
| 0.8 | 163 | 110 | 263 | 94 |
| | 164 | 102 | 264 | 79 |
| | average | 106 | average | 87 |
| 1.0* | 165 | 84 | 265 | 69 |

*X = 1.0 is outside the scope of the invention

As is clear from the results in Table 7, the joined composite bodies according to the invention wherein the space is arranged between the tip end surface of the projection of the ceramic member and the bottom surface of the recess of the metallic member and the joining is carried out by the press fitting have larger joining strengths than those of the Comparative Example 3.

EXPERIMENT 6

A turbine rotor 71 having a shaft portion and a vane wheel integrally formed therewith was prepared from a silicon nitride sintered body obtained by pressureless sintering. The turbine rotor had a projection 72 of 12.0 mm in diameter and 7.5 mm in length at one end. A metallic bar of a solution-treated Incoloy 903 having a diameter of 21 mm, one end of which was friction-welded to an alloy steel having a diameter of 12 mm such as JIS-SNCM439. Then, an end of the alloy steel was machined into a necessary outer diameter for a turbocharger rotor, and a recess 75 having an inner diameter of 12.05 mm and a depth of 7.0 mm was arranged at an end of the round bar made of Incoloy 903. After the inner peripheral surface of the recess was plated with Ni, the joining was effected by the same method as that of Experiment 4 so as to obtain a joined composite body for the turbocharger rotor having a joining portion shown in FIG. 9. In this embodiment, a seal-ring groove 76 and an oil-slinger groove 77 were arranged around the entire circumference of the outer peripheral surface of the metallic member, and a joining end 79 was located at a position corresponding to the seal-ring groove 76. Moreover, a bottom diameter of the seal-ring groove 76 was 15 mm and an outer diameter of the recess of the metallic member was 20 mm. This dimension mentioned above corresponds to X=0.375 in the Experiment 4. With respect to the joined composite body, a finish working was carried out so as to obtain a turbine rotor for the turbocharger rotor having a structure shown in FIG. 9.

On the other hand, ceramic members and metallic members formed in the manner mentioned above were joined together in the same manner as explained in the Comparative Example 1 and the Comparative Example 2 to obtain joined composite bodies of the Comparative Examples 1 and 2. Then, with respect to the joined bodies, a forming of grooves, a positioning of the joining end and a finish working were carried out in the manner mentioned above so as to obtain turbine rotors for the turbocharger rotor as the comparative examples.

Then, the turbine rotors according to the present invention and the comparative examples were installed in a rotation test apparatus in high temperatures, and a rotation test was performed under the condition of 200,000 rpm at 800° C. As a result, the joined composite bodies according to the invention were not broken at all on this rotation test and no damage was detected. Contrary to this, the joined composite bodies according to the comparative examples were broken before the rotation reached 200,000 rpm.

As shown in this Experiment 6, if the present invention applies to the turbine rotor for the turbocharger rotor and the gas turbine rotor having the seal-ring groove and/or the oil-slinger groove on the outer peripheral surface of the recess of the metallic member, the seal-ring groove and the oil-slinger groove can be used as the groove according to the invention, and thus the present invention can be performed effectively in an easy manner.

FIGS. 12 through 16 are to illustrate the third and the fourth aspects of the present invention.

FIGS. 12a and 12b are partially sectional schematic views of ceramic-metal joined composite bodies according to the third aspect of the present invention. In each embodiment, a projection 102 of a ceramic member 101 is joined to a recess 104 of a metallic member 103 by a brazing method utilizing a brazing metal 105, and the brazing metal 105 is not chemically joined over the entire peripheral surface to the projection 102 of the ceramic member 101 by a predetermined distance l from a joining end 106, and a space 107 is arranged between the bottom surface of the recess and the tip end surface of the projection 102. Hereinafter, the predetermined distance l is referred to a chemically non-joined distance. To achieve the chemically non-joined distance l between the projection 102 of the ceramic member 101 and the brazing metal 105, materials such as graphite not chemically joined to the brazing metal are arranged on a part of the projection 102 of the ceramic member 101 to be not chemically joined, and the normal brazing operation is performed.

In the embodiment shown in FIG. 12a, Ni is plated onto at least inner peripheral surface of the recess 104 of the metallic member 103 to be joined, and graphites not chemically joined to the brazing metal are arranged onto a part of the projection 102 of tee ceramic member 101 by the chemically non-joined distance l from the joining end 106 and onto a tip end surface of the projection 102. After that, the joining is carried out by utilizing the active brazing metal, thereby preparing a metal-ceramic joined composite body wherein a contact surface to be joined between the inner peripheral surface of the recess 104 and the outer peripheral surface of the projection 102 of the ceramic member 101 is brazed, and the projection 104 is not chemically joined to the active brazing metal 105 by the chemically non-joined distance l from the joining end 106, and a space 107 is arranged between the bottom surface of the recess 104 and the tip end surface of the projection 102. Moreover, when use is made of normal Ag-Cu brazing alloy including no active metal component, the joining mentioned above can be performed by plating Ni onto at least inner peripheral surface of the recess, arranging a metallizing layer onto at least outer peripheral surface of the projection 102 except for a part of the chemically non-joined distance l from the joining end, and plating Ni onto the metallizing layer.

In the embodiment shown in FIG. 12b, Ni is plated onto at least inner peripheral surface of the recess 104 to be joined, and graphite are arranged onto a part of the projection 102 by the chemically non-joined distance l and onto a tip end surface of the projection 102, and a graphite felt 108 which is a low elasticity intermediate member made of a material not joinable to the solder and an active brazing metal applied on the graphite felt are arranged on the bottom surface of the recess 104 which is in contact with the tip end surface of the projection 102. After that, the projection 102 is inserted into the recess 104 so as to form a joining assembly, and the joining assembly is heated in vacuum so as to melt and penetrate the active brazing metal into contact surfaces by using a capillary action, thereby preparing a joined composite body wherein the outer peripheral surface of the projection 102 is joined to the inner peripheral surface of the recess 104 by the brazing metal, while a part of the projection 102 is not chemically joined to the active brazing metal 105 by the chemical non-joined distance l from the joining end 106, and the bottom surface of the recess 104 is not directly joined or contact to the tip end surface of the projection 102 by arranging the intermediate member therebetween.

As shown in FIGS. 12a and 12b, in the joined composite body having the structure wherein the bottom surface of the recess 104 is not directly in contact or joined to the tip end surface of the projection 102 by arranging the space 107 or the graphite felt 108 therebetween, it is possible to prevent a stress concentration at the tip end surface of the projection 102 or near the joining end 106 occurring when the bottom surface of the recess 104 is in contact or joined to the tip end surface of the projection 102.

Figure 13B:
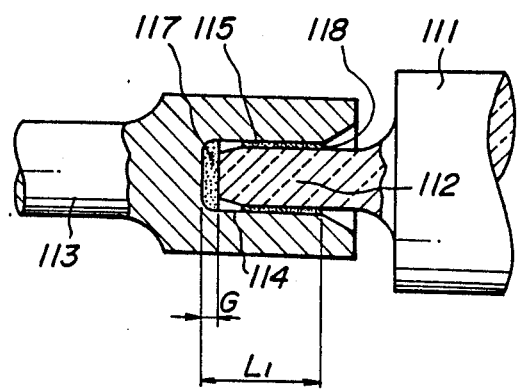

FIGS. 13a and 13b are partially sectional schematic views illustrating the fourth aspect of the metal-ceramic joined composite body according to the invention, respectively. In each embodiment, an outer peripheral surface of a projection 112 of a ceramic member 111 is joined to an inner peripheral surface of a recess 114 of a metallic member 113 by using a brazing metal 115, and it is assumed that $L_1$ is a distance from a bottom surface of the recess 114 to a joining end 118 and G is a thickness of a space or an intermediate member.

In the embodiment shown in FIG. 13a, Ni is plated onto at least inner peripheral surface of the recess 114 to be joined, and graphites are arranged onto a tip end surface of the projection 112. After that, an outer peripheral surface of the projection 112 is joined to an inner peripheral surface of the recess 114 by using the active brazing metal 115 in such a manner that a distance between a bottom surface of the recess 114 and the joining end 118 is set to $L_1$ and a space 116 having a thickness of G is arranged between the bottom surface of the recess 114 and a tip end surface of the projection 112. Moreover, when use is made of normal Ag-Cu brazing alloy including no active metal component, the joining mentioned above can be performed by plating Ni onto at least inner peripheral surface of the recess, arranging a metallizing layer onto outer peripheral surface of the projection 112 except for a part of the chemically non-joined distance l from the joining end, and plating Ni onto the metallizing layer.

In the embodiment shown in FIG. 13b, Ni is plated onto at least inner peripheral surface of the recess 114 to be joined, and a graphite felt 117 having a thickness of G which is not chemically joined to the brazing metal and the active brazing metal provided on the graphite felt 117 are arranged on the bottom surface of the recess 114. Further, graphites are arranged onto the tip end surface of the projection 112. After that, the projection 112 is inserted into the recess 114 so as to form a joining assembly, and the joining assembly is heated in vacuum so as to melt and penetrate the active brazing metal into contact surfaces by using a capillary action, thereby preparing a joined composite body wherein the distance between the bottom surface of the recess 114 and the joining end 118 is $L_1$ and the bottom surface of the recess 114 is not directly joined or contact to the tip end surface of the projection 112 by arranging the intermediate member therebetween.

Further, in the embodiments shown in FIGS. 13a and 13b, if it is assumed that the coefficient of thermal expansion of the ceramic member and the metallic member are $\alpha'$ and $\alpha$, and a solidifying temperature of the active brazing metal or the brazing metal 105 and a room temperature are $T_S$ and $T_R$, it is preferable to set the thickness G of the space or the intermediate member to a value satisfying a relation $G/L_1 > (\alpha - \alpha') \times (T_S - T_R)$, because the joined composite body having a larger joining strength can be obtained.

Hereinafter, the experiments according to the third and fourth aspects of the present invention will be explained.

EXPERIMENT 7 (THIRD ASPECT OF THE INVENTION)

A metallic member 103 having a recess 104 at one end and a thin shaft portion was prepared from a round bar of a solution-treated Incoloy 903 having a diameter of 18 mm. The recess had an inner diameter of 11.05 mm and a depth of 8 mm, and the thin shaft portion had a diameter of 12 mm. A ceramic member 101 was prepared from a silicon nitride sintered body obtained by pressureless sintering. The ceramic member had a projection 102 of 11.0 mm in diameter and 10 mm in length at one end.

A corner of the bottom of the recess 104 was beveled at 0.2° C., and a corner of an opening end of the recess 104 was tapered. An edge portion of a tip end of the projection 102 was similarly tapered at 0.5° C., and its base portion was rounded at R2.

The metallic member was joined to the ceramic member as shown in FIGS. 12a and 12b mentioned above by utilizing an active brazing metal in which Ti was vapor deposited in a thickness of 2 μm onto an Ag-Cu brazing alloy plate having a thickness of 0.1 mm. In this case, by varying the chemically non-joined distance l under the condition that the distance between the joining end 106 and the bottom surface of the recess was fixed to 5 mm, the joined composite bodies according to the invention were prepared. Moreover, in the embodiments shown in FIGS. 12a and 12b, a thickness of the Ni plating is 10 μm, and further in the embodiment shown in FIG. 12b, use is made of the graphite felt having a thickness of 0.4 mm as the low elasticity intermediate member. On the other hand, the joined composite bodies having a structure shown in FIG. 12c were prepared as the comparative examples, wherein all contact surface between the inner surface of the recess 104 and the outer surface of the projection 102 was brazed without arranging the space or the intermediate member between the bottom surface of the recess 104 and the tip end surface of the projection 102.

With respect to the joined composite bodies according to the invention and the comparative example, the bending test was performed by using the bending test apparatus shown in FIG. 11 under the condition that $l_1 = 40$ mm and $l_2 = 5$ mm. At first, the metallic member 103 was set to the bending test apparatus and the load P is applied to the ceramic member 101. Then, the bending load when the projection 102 of the ceramic member 101 was broken near the joining end was assumed as the failure load in bending at break. Results were shown in Table 8 and FIG. 14.

TABLE 8

| The chemically non-joined distance l (mm) | Failure load in bending P (kg) | | |
|---|---|---|---|
| | Comparative Example | FIG. 12a | FIG. 12b |
| 0 | 31 | 106 | 103 |
| | 43 | — | — |
| | 15 | — | — |
| 0.5 | | 120 | 130 |
| | | 133 | 142 |
| | | 135 | 123 |
| 1.0 | | 166 | 171 |
| | | 153 | 158 |
| | | 167 | 160 |
| 2.0 | | 183 | 187 |
| | | 168 | 180 |
| | | — | — |
| Not chemically joined over entire side surface of the projection | — | 185 | 191 |
| | | 174 | 186 |
| | — | — | — |

As is clear from the results shown in Table 8 and FIG. 14, the joined composite body according to the present invention wherein the chemically non-joined distance l is not 0 and the space or the intermediate member is arranged between the bottom surface of the recess and the tip end surface of the projection has the larger failure load in bending than that of the joined composite body according to the comparative example wherein the chemically non-joined distance l is 0 and the bottom surface of the recess and the tip end surface of the projection are joined by brazing. Moreover, larger failure loads in bending can be obtained if the chemically non-joined distance l is not less than 0.5 mm under the condition that the joining distance is substantially 5 mm, and it is more preferable that if the chemically non-joined distance l is not less than 1.0 mm, failure load in bending is still larger. The largest failure load in bending can be obtained by the joining composite body wherein an entire side surface of the projection is not chemically joined.

Further, the joined composite body shown in FIG. 12b wherein the graphite felt is arranged between the bottom surface of the recess and the tip end surface of the projection shows a little larger failure load in bending than that of the joined composite body shown in FIG. 12a wherein the space is arranged between the bottom surface of the recess and the tip end surface of the projection.

EXPERIMENT 8 (FOURTH ASPECT OF THE INVENTION)

A metallic member 113 having a recess 114 at one end and a thin shaft portion was prepared from a round bar of a solution-treated Incoloy 903 having a diameter of 18 mm. The recess had an inner diameter of 11.05 mm and a depth of 8 mm, and the thin shaft portion had a diameter of 12 mm. A ceramic member 111 was prepared from a silicon nitride sintered body obtained by pressureless sintering. The ceramic member had a projection 112 of 11.0 mm in diameter and 10 mm in length at one end.

A corner of the bottom of the recess 114 was beveled at 0.2° C., and a corner of an opening end of the recess 114 was tapered. An edge portion of a tip end of the projection 112 was similarly tapered at 0.5° C., and its base portion was rounded at R2.

The metallic member was joined to the ceramic member as shown in FIGS. 13a and 13b mentioned above by utilizing an active brazing metal in which Ti was plated in a thickness of 2 μm onto an Ag-Cu brazing metal plate having a thickness of 0.1 mm. In this case, by varying the thickness G of the space and the intermediate member such as the graphite felt, the joined composite bodies according to the invention were prepared. Moreover, in the embodiments shown in FIGS. 13a and 13b, a thickness of the Ni plating is 10 μm. In these embodiments, since the coefficient of thermal expansion (α) of the metallic material is $13.0 \times 10^{-6}$ 1/° C., the coefficient of thermal expansion (α') of the ceramic member is $3.5 \times 10^{-6}$ 1/° C., the solidifying temperature $T_S$ of the brazing metal is 780° C. and the room temperature $T_R$ is 20° C.

On the other hand, the joined composite bodies having a structure shown in FIG. 15 were prepared wherein all contact surface between the inner surface of the recess 114 and the outer surface of the projection 112 was brazed without arranging the space or the intermediate member between the bottom surface of the recess 114 and the tip end surface of the projection 112.

With respect to the joined composite bodies according to the invention and the comparative example, the bending test was performed by using the bending test apparatus shown in FIG. 11 under the condition that $l_1 = 40$ mm and $l_2 = 5$ mm. At first, the metallic member 113 was set to the bending test apparatus and the load P is applied to the ceramic member 111. Then, the bending load when the projection 112 of the ceramic member 111 was broken near the joining end was assumed as the failure load in bending at break. Results were shown in Table 9 and FIG. 16. Here, the thickness G of the space G shown in FIG. 13a was measured by an optical microscope after cutting out the joined composite body, and the thickness G of the intermediate member shown in FIG. 13b was measured from the intermediate member before the joining.

TABLE 9

|  | Number of examples | $G/L_1$ | Average failure load in bending P (kg) |
|---|---|---|---|
| FIG. 13a | 5 | $5 \times 10^{-3}$ | 40 |
| Present | 7 | $10 \times 10^{-3}$ | 77 |
| invention | 4 | $20 \times 10^{-3}$ | 91 |
|  | 4 | $50 \times 10^{-3}$ | 107 |
| FIG. 13b | 5 | $5 \times 10^{-3}$ | 43 |
| Present | 5 | $10 \times 10^{-3}$ | 72 |
| invention | 5 | $20 \times 10^{-3}$ | 94 |
|  | 5 | $50 \times 10^{-3}$ | 105 |
| Comparative Example | 10 | 0 | 33 |

As is clear from the results shown in Table 9 and FIG. 16, the joined composite body according to the present invention wherein a predetermined space or intermediate member is arranged has the larger failure load in bending than that of the joined composite body according to the comparative example wherein no space or intermediate member is arranged. Moreover, when a value of $G/L_1$ is in excess of $7.2 \times 10^{-3}$ which is calculated from $(\alpha - \alpha') \times (T_3 - T_R)$, a sufficiently larger failure load in bending at break can be obtained. In this case, the value of $G/L_1$ is preferable in $G/L_1 > 10 \times 10^{-3}$ and is more preferable in $G/L_1 > 20 \times 10^{-3}$.

EXPERIMENT 9 (FOURTH ASPECT OF THE INVENTION)

In order to determine a joining strength in a high temperature, a normal tensile strength test was carried out in a test temperature 450° C. with respect to the same joined composite bodies as shown in the Experiment 8. Results were shown in Table 10.

TABLE 10

|  | Number of examples | $G/L_1$ | Average tensile strength (kg) |
|---|---|---|---|
| FIG. 13a | 2 | 0.5 | 660 |
| Present | 3 | 0.4 | 1,010 |
| invention | 3 | 0.3 | 1,280 |
|  | 5 | 0.2 | 1,470 |
| FIG. 13b | 3 | 0.5 | 690 |
| Present | 3 | 0.4 | 1,040 |
| invention | 3 | 0.3 | 1,300 |
|  | 3 | 0.2 | 1,530 |

As is clear from the results shown in Table 10, when the value of $G/L_1$ becomes larger, the joining strength in a high temperature is lowered correspondingly. Moreover, the value of $G/L_1$ is preferable in $G/L_1 \leq 0.4$ and is more preferable in $G/L_1 \leq 0.3$. This is because the joined area becomes smaller.

As can be understood from the results shown in Experiments 8 and 9. It is preferable to set the thickness G of the space or the intermediate member such as the graphite felt to a value such that the tip end surface of the projection and the bottom surface of the recess are not mutually interfered due to a difference of thermal expansion therebetween.

EXPERIMENT 10 (FOURTH ASPECT OF THE INVENTION)

A turbine rotor having a shaft portion and a vane wheel integrally formed therewith was prepared from a silicon nitride sintered body obtained by pressureless sintering. The turbine rotor had a projection of 12.0 mm in diameter and 7.5 mm in length at one end. A metallic bar of a solution-treated Incoloy 903 having a diameter of 21 mm, one end of which was friction-welded to an alloy steel having a diameter of 12 mm such as JIS-SNCM439. Then, an end of the alloy steel was machined into a necessary outer diameter for a turbocharger rotor, and a recess having an inner diameter of 12.05 mm and a depth of 7.0 mm was arranged at one end of the metallic round bar made of Incoloy 903. After at least the inner peripheral surface of the recess was plated with Ni, the joining was effected by the same method as that of Experiment 8 so as to obtain joined composite bodies for the turbocharger rotors having the space as shown in FIG. 13a and having the graphite felt as shown in FIG. 13b. In these embodiments, the thickness G of the space or the graphite felt was set to a value satisfying $G/L_1 = 20 \times 10^{-3}$.

On the other hand, turbine rotors for the turbocharger having the same dimensions as those explained above were prepared as a comparative example by brazing the entire contact surface between the inner surface of the recess and the outer surface of the projection with no space or intermediate member between the bottom surface of the recess and the tip end surface of the projection.

The turbine rotors for the turbocharger according to the present invention and the comparative example were set to the rotation test apparatus in high temperatures, and the rotation test was carried out in a high temperature.

As a result, the turbine rotors according to the invention were not broken under the condition of 200,000 rpm at 800° C., but the turbine rotors according to the comparative example were broken before the rotating speed reached 200,000 rpm.

FIGS. 17 through 19 are to illustrate the fifth aspect of the present invention.

FIGS. 17a to 17c are partially sectional schematic views showing one embodiment of a metal-ceramic joined composite body according to the present invention, respectively. In each embodiment, a projection 202 of a ceramic member 201 is joined to a recess 204 of a metallic member 203 by the brazing utilizing an active brazing metal 205 or a normal brazing metal 205 including no active metal, and a thickness of the brazing metal 205 decreases toward an opening of the recess beyond an outward enlargement-starting position 206 of the recess 204. Moreover, a space or a low elasticity intermediate member made of a material having no joinability to the brazing metal is provided between a tip end surface of the projection 202 and a bottom surface of the recess 204.

In the embodiment shown in FIG. 17a, Ni is plated onto at least an inner peripheral surface of the recess 204 to be joined and onto an inner peripheral surface of the recess 204 situating outwardly beyond the outward enlargement-starting position 206, and graphite are arranged onto the tip end surface of the projection 202. After that, the projection 202 is joined to the recess 204 by the brazing utilizing the active brazing metal 205 in such a manner that a space 207 is arranged between the bottom surface of the recess 204 and the tip end surface of the projection 202 and the thickness of the brazing metal 205 decreases toward an opening of the recess 204 beyond the outward enlargement-starting position 206. Moreover, when use is made of normal Ag-Cu brazing metal including no active metal component, the joining mentioned above can be performed by plating Ni onto the inner peripheral surface of the recess 204, arranging a metallizing layer or a film of the active metal onto the outer peripheral surface of the projection 202 to be joined.

In the embodiment shown in FIG. 17b, Ni is plated onto an inner peripheral surface of the recess 204. Moreover, a metallizing layer having a predetermined length is arranged on an outer peripheral surface of the projection 202 situating outwardly beyond the outward enlargement-starting position 206, and Ni is plated onto the metallizing layer. Then, a graphite felt 208 as the low elasticity intermediate member having no joinability to the brazing metal is arranged onto the bottom surface of the recess 204 at which the tip end surface of the projection 202 is brought into contact. After that, the projection 202 is joined to the recess 204 by the brazing utilizing the normal Ag-Cu brazing metal 205 including no active metal component in such a manner that the tip end surface of the projection 202 is not directly joined or brought into contact with the bottom surface of the recess 204 and the thickness of the brazing metal 205 decreases toward an opening of the recess 204 beyond the outward enlargement-starting position 206.

In the embodiment shown in FIG. 17c, Ni is plated onto at least an inner peripheral surface of the recess 204 to be joined and onto an inner peripheral surface of the recess 204 situating outwardly beyond the outward enlargement-starting position 206, and graphite are arranged onto the tip end surface of the projection 202. Then, a graphite felt 208 as the low elasticity intermediate member having no joinability to the brazing metal is arranged onto the bottom surface of the recess 204 at which the tip end surface of the projection 202 is brought into contact. After that, the projection 202 is joined to the recess 204 by the brazing utilizing the active brazing metal 205 in such a manner that the tip end surface of the projection 202 is not directly joined or brought into contact with the bottom surface of the recess 204 and the thickness of the brazing metal 205 decreases toward an opening of the recess 204 beyond the outward enlargement-starting position 206.

FIGS. 18a and 18b are enlarged cross sectional views showing the outward enlargement-starting position 206, respectively. In the embodiment shown in FIG. 18a the brazing metal 205 is arranged on the inner peripheral surface of the recess 204, and the thickness of the brazing metal 205 decreases toward an opening of the recess 204 from the outward enlargement-starting position 206. In the embodiment shown in FIG. 18b, the brazing metal 205 is arranged on the outer peripheral surface of the projection 202, and the thickness of the brazing metal 205 decreases toward an opening of the recess 204 beyond the outward enlargement-starting position 206.

Hereinafter, an experiment according to fifth aspect of the present invention will be explained.

EXPERIMENT 11

Metal-ceramic joined composite bodies according to the present invention illustrated in FIGS. 17a to 17c were formed. A metallic member 203 having a recess 204 at one end and a thin shaft portion was prepared from a round bar of a solution-treated Incoloy 903 having a diameter of 18 mm. The recess had an inner diameter of 11.05 mm and a depth of 8 mm, and the thin shaft portion having a diameter of 12 mm. A ceramic member 201 was prepared from a silicon nitride sintered body obtained by pressureless sintering. The ceramic member had a projection 202 of 11.0 mm in diameter and 10 mm in length at one end.

A corner of the bottom of the recess 204 was beveled at 0.2° C., and a corner of an opening end of the recess 204 was rounded at R 1.5. An edge portion of a tip end of the projection 202 was similarly tapered at 0.5° C., and its base portion was rounded at R2.

The metallic member was joined to the ceramic member as shown in FIGS. 17a to 17c mentioned above by utilizing an active brazing metal in which Ti was vapor deposited in a thickness of 2 $\mu$m onto an Ag-Cu brazing metal plate having a thickness of 0.1 mm. In this case, a distance between the joining end 209 and the bottom surface of the recess was about 7 mm, and the thickness G of the space or the intermediate member made of a material not joinable to the brazing metal was 0.4 mm. Further, the thickness of Ni plating applied on the inner peripheral surface of the recess 204 was 10 $\mu$m. Moreover, in this embodiment, the coefficient of thermal expansion of the metallic member was $13.0 \times 10^{-6}$ 1/° C. (20°~800° C.), the coefficient of thermal expansion of the ceramic member was $3.5 \times 10^{-6}$ 1/° C. (40°~1,000° C.), and the solidifying temperature of the brazing metal was 780° C.

On the other hand, a metal-ceramic joined composite body having a structure shown in FIG. 19 was prepared as a comparative example. Dimensions of the metallic member and the ceramic member used in the joined composite body shown in FIG. 19 were the same as those of the joined composite body according to the invention. In the embodiment shown in FIG. 19a, the space or the intermediate member was not arranged between the bottom surface of the recess 204 and the tip end surface of the projection 202, and all the contact surfaces between the inner surface of the recess 204 and the outer surface of the projection 202 were substantially brazed. Moreover, the brazing metal was not arranged outwardly beyond the outward enlargement-starting. In the embodiment shown in FIG. 19b, the space or the intermediate member was not arranged between the bottom surface of the recess 204 and the tip end surface of the projection 202, and all the contact surfaces between the inner surface of the recess 204 and the outer surface of the projection 202 were substantially brazed. Moreover, the brazing metal was arranged in such a manner that the thickness of the brazing metal decreases toward the opening of the recess 204 beyond the outward enlargement-starting position.

With respect to the joined composite bodies according to the invention and the comparative example, the bending test was performed by using the bending test apparatus shown in FIG. 11 under the condition that $l_1 = 40$ mm and $l_2 = 5$ mm. At first, the metallic member 203 was set to the bending test apparatus and the load P was applied to the ceramic member 201. Then, the bending load when the projection 202 of the ceramic member 201 was broken near the joining end was assumed as the failure load in bending at break. Results were shown in Table 11.

TABLE 11

|  |  | Number of examples | Failure load in bending P (kg) | |
|---|---|---|---|---|
|  |  |  | Average | Standard deviation |
| Present invention | FIG. 20a | 4 | 142 | 16 |
|  | FIG. 20b | 5 | 138 | 8 |
|  | FIG. 20c | 5 | 145 | 7 |
| Comparative Example | FIG. 22a | 3 | 37 | 24 |
|  | FIG. 22b | 5 | 58 | 20 |

As is clear from the results shown in Table 11, the metal-ceramic joined composite body according to the invention has the larger failure load in bending than that of the joined composite body according to the comparative example. Moreover, the metal-ceramic joined composite body wherein the graphite felt 208 is arranged between the bottom surface of the recess 204 and the tip end surface of the projection 202 has smaller variation in failure load in bending than the joined composite body wherein the space 207 is arranged between the bottom surface of the recess 204 and the tip end surface of the projection 202. Further, the joined composite body wherein the brazing metal is arranged on the inner peripheral surface of the recess 204 and the thickness of the brazing metal decreases gradually toward the opening of the recess 204 beyond the enlargement-starting position has the larger failure load in bending than that of the joined composite body wherein the brazing metal is arranged on the outer peripheral surface of the projection 202. Further, the joined composite body shown in FIG. 19b has the larger failure load in bending than that of the joined composite body shown in FIG. 19a, but has not a sufficient bending strength.

The present invention is not limited to the embodiments mentioned above, but various modifications can be possible within the scope of the invention. For example, in the embodiment wherein the space or the intermediate member is arranged between the bottom surface of the recess and the tip end surface of the projection, it is possible to arrange both of the space and the intermediate member in a mixed manner.

As can be understood from the embodiments mentioned above, according to the present invention, it is possible to joint the projection of the ceramic member to the recess of the metallic member in a manner that the joined composite body is not easily broken by the twisting and the bending load, and thus the metal-ceramic joined composite body having a good reliability can be obtained.

Therefore, if the turbocharger rotor is constructed by the joined composite body according to the invention, it is possible to obtain the highly efficient turbocharger rotor having a lowered residual stress, a buffer function of the brazing metal, a prevention of the insertion of corrosion gas into the joining interface, a good durability and a good response.

What is claimed is:

1. A metal-ceramic joined composite body comprising a ceramic member having a projection formed thereon, at least a portion of said projection having a constant outer diameter, and a metallic member having a recess formed therein, at least a portion of said recess having a constant inner diameter, corresponding to that portion of the projection having a constant outer diameter, said projection being inserted and joined into said recess such that an outer peripheral surface of the projection is integrally joined to an inner peripheral surface of the recess by brazing substantially only at that portion of the projection having a constant outer diameter and that portion of the recess having a constant inner diameter, wherein said joining between the metallic member and the ceramic member is substantially limited to the joining between the outer peripheral surface of the projection and the inner peripheral surface of the metallic member by providing a thin layer made of a material not joinable to a brazing metal onto a surface of a tip end of the projection and interposing a low elasticity intermediate member of a material not joinable to a brazing metal between the surface of the tip end of the projection and the bottom surface of the recess.

2. A metal-ceramic joined composite body according to claim 1, wherein the material provided onto a surface of a tip end of the projection is carbon.

3. A metal-ceramic joined composite body according to claim 1, wherein the intermediate member is a low elasticity material selected from the group consisting of a sliver, a felt, a web, a web sintered body, and a woven cloth.

4. A metal-ceramic joined composite body according to claim 1, wherein the brazing metal is an alloy containing an active metal.

5. A metal-ceramic joined composite body according to claim 1, wherein a ratio (L/D) of an axially joining distance (L) between that portion of the outer peripheral surface of the projection which has the constant outer diameter and that portion of the inner peripheral surface of the recess which has the constant inner diameter corresponding to that portion of the projection which has the constant outer diameter to a diameter (D) of the projection is in a range from 0.2 to 0.8.

6. A metal-ceramic joined composite body according to claim 1, wherein the ceramic member is a rotary shaft of a turbocharger rotor wheel, and the metallic member is a rotary shaft of a compressor wheel.

7. A process for joining a metal-ceramic joined composite body by inserting a projection formed on a ceramic member into a recess formed in a metallic member and integrally joining an outer peripheral surface of the projection to an inner peripheral surface of the recess by brazing, said process comprising the steps of:
(a) forming the recess and the projection in one end of the metallic member and on the ceramic member, respectively;
(b) plating Ni on a portion of the inner peripheral surface of the recess of the metallic member to be joined to the outer peripheral surface of the ceramic member, arranging a low elasticity member on a bottom surface of the recess, and placing a brazing metal on the low elasticity member;
(c) coating graphite on a tip end of the projection;
(d) forming a joining assembly of the ceramic member and the metallic member by inserting the projection into the recess;
(e) melting the brazing metal by heating the assembly at a temperature not lower than a melting point of the brazing metal in vacuum or in an inert atmosphere, and filling the molten brazing metal into a gap between the outer peripheral surface of the projection and the inner peripheral surface of the recess; and
(f) completing the joining between the outer peripheral surface of the projection of the ceramic member and the inner peripheral surface of the recess of the metallic member by solidifying the brazing metal through cooling the assembly.

8. A process for joining a metal-ceramic joined composite body according to claim 7, wherein the molten brazing metal is filled into the gap between the outer peripheral surface of the projection of the ceramic member and the inner peripheral surface of the metallic member by utilizing a capillary action.

9. The process of claim 7, wherein said brazing metal contains an active metal.

10. A metal-ceramic joined composite body comprising a ceramic member having a projection formed thereon, at least a portion of said projection having a constant outer diameter, and a metallic member having a recess formed therein, at least a portion of said recess having a constant inner diameter, corresponding to that portion of the projection having a constant outer diameter, said projection being inserted and joined into said recess, such that an outer peripheral surface of the projection is integrally joined to an inner peripheral surface of the recess by brazing substantially only at that portion of the projection having a constant outer diameter and that portion of the recess having a constant inner diameter, wherein a trip end surface of the projection is not joined to a bottom surface of the recess, and a groove is formed around substantially the entire circumference of the outer peripheral surface of the metallic member such that a joining end of a joined portion between the outer peripheral surface of the projection and the inner peripheral surface of the metallic member is located at a position corresponding to the groove.

11. A process for joining a metal-ceramic joined composite body by inserting a projection formed on a ceramic member into a recess formed in a metallic member and integrally joining an outer peripheral surface of the projection to an inner peripheral surface of the recess by brazing, said process comprising the steps of:
(a) forming the recess and the projection in one end of the metallic member and on one end of the ceramic member, respectively;
(b) plating Ni on a portion of the inner peripheral surface of the recess of the metallic member to be joined to the outer peripheral surface of the ceramic member, placing a low elasticity member, and arranging a brazing metal on the low elasticity member;
(c) coating graphite on a tip end of the projection;
(d) forming a joining assembly of the ceramic member and the metallic member by inserting the projection into the recess;
(e) melting the brazing metal by heating the assembly at a temperature not lower than a melting point of the brazing metal in vacuum or in an inert atmosphere, and filling the molten brazing metal into a gap between the outer peripheral surface of the projection and the inner peripheral surface of the recess;
(f) completing the joining between the outer peripheral surface of the projection of the ceramic member and the inner peripheral surface of the recess of the metallic member by solidifying the brazing metal through cooling the assembly; and
(g) forming a groove around substantially the entire circumference of the outer periphery of the metallic member at a position corresponding to a joining end between the outer peripheral surface of the projection of the ceramic member and the inner peripheral surface of the recess of the metallic member.

12. The process of claim 11, wherein said brazing metal contains an active metal.

13. A process for joining a metal-ceramic joined composite body by inserting a projection formed on a ceramic member into a recess formed in a metallic member and integrally joining an outer peripheral surface of the projection to an inner peripheral surface of the recess by brazing, said process comprising the steps of:
(a) forming the recess and projection in one end of the metallic member and on one end of the ceramic member, respectively;
(b) forming a metallizing layer containing no active metal on a portion of the outer peripheral surface of the projection of the ceramic member to be joined to the inner peripheral surface of the recess of the metallic member and plating Ni on the metallizing layer;
(c) placing a low elasticity member on a bottom surface of the recess, arranging a brazing metal containing no active metal onto a bottom surface of the recess, and forming a joining assembly of the ceramic member and the metallic member by inserting the projection into the recess;
(d) melting the brazing metal by heating the assembly at temperatures not lower than a melting point of the brazing metal in vacuum or in an inert atmosphere, and filling the molten brazing metal into a gap between the outer peripheral surface of the projection and the inner peripheral surface of the recess;
(e) completing the joining between the outer peripheral surface of the projection of the ceramic member and the inner peripheral surface of the recess of the metallic member by solidifying the brazing metal through cooling the assembly; and
(f) forming a groove around substantially the entire outer circumference of the outer periphery of the metallic member at a position corresponding to a joining end between the outer peripheral surface of the projection of the ceramic member and the inner peripheral surface of the recess of the metallic member.

14. A metal-ceramic joined composite body comprising a ceramic member having a projection formed thereon and a metallic member having a recess formed therein, said projection being inserted into the recess and an outer peripheral surface of the projection being integrally joined to an inner peripheral surface of the recess by brazing, wherein the projection and the brazing metal are not firmly fixed together at at least a joining end of a joined portion between an outer peripheral surface of the projection of the ceramic member and an inner peripheral surface of the recess of the metallic member through chemical joining, and a low elasticity intermediate member made of a material not joinable to the brazing metal is provided between a surface of a tip end of the projection and a bottom surface of the recess.

15. A metal-ceramic joined composite body comprising a ceramic member having a projection formed thereon and a metallic member having a recess formed therein, said projection being inserted into said recess and an outer peripheral surface of the projection being integrally joined to an inner peripheral surface of the recess by brazing, wherein a low elasticity intermediate member made of a material not joinable to a brazing metal is provided between a surface of a tip end of the projection of the ceramic member and a bottom surface of the metallic member, and the thickness G of the space or the intermediate member meets the following inequality:

$$\frac{G}{L_1} > (a - a') \times (T_S - T_R)$$

in which $L_1$, $a$, $a'$, $T_S$ and $T_R$ are a distance between the bottom surface of the recess of the metallic member and a joining end of a joined portion, a coefficient of thermal expansion of the metallic member, a coefficient of thermal expansion of the the ceramic member, a solidifying temperature of the brazing metal, and room temperature, respectively.

16. A metal-ceramic joined composite body comprising a ceramic member having a projection formed thereon and a metallic member having a recess formed therein, said recess having an inner diameter which, at a radially outward enlarged portion thereof, gradually increases toward an opening thereof, said projection being inserted into the recess and an outer peripheral portion of the projection being integrally joined to an inner peripheral surface of the recess through a brazing metal containing an active metal, wherein the inner peripheral surface of the recess is plated with Ni up to a point axially spaced outwardly from a starting point of said enlarged portion of the recess and the brazing metal is interposed between the outer peripheral surface of the projection and the inner peripheral surface of the recess such that the thickness of the brazing metal decreases toward an opening of the recess beyond the starting point of said enlarged portion of the recess, and an intermediate member made of a material having no joinability to the brazing metal is provided between a surface of a tip end of the projection and a bottom surface of the recess.

17. A metal-ceramic joined composite body comprising a ceramic member having a projection formed thereon and a metallic member having a recess formed therein, said recess having an inner diameter which, at a radially outward enlarged portion thereof, gradually increases in a direction of an opening of the recess, said projection being inserted into the recess and an outer peripheral surface of the projection being integrally joined in an inner peripheral surface of the recess through a brazing metal, wherein the inner peripheral surface of the recess is plated with Ni up to a point axially spaced outwardly from a starting point of said enlarged portion of the recess, said brazing metal being an Ag-Cu brazing material containing no active metal or a foil of an active metal and the thickness of the brazing material decreases axially outwardly beyond said enlarged portion of the recess in a direction of an opening of the recess, and an intermediate member made of a material having no joinability to the brazing material is provided between a surface of a tip end of the projection and a bottom surface of the recess.

18. A metal-ceramic joined composite body comprising a ceramic member having a projection formed thereon and a metallic member having a recess formed therein, said recess having an inner diameter which, at a radially outward enlarged portion thereof, gradually increases toward an opening thereof, said projection being inserted into the recess and an outer peripheral surface of the projection being integrally joined to an inner peripheral surface of the recess through a brazing metal, wherein a metalizing layer or a foil of an active metal is provided on a portion of the outer peripheral surface of the projection up to a point axially spaced outwardly from a starting point of said enlarged portion of the recess, said brazing metal being an Ag-Cu brazing material containing no active metal and the thickness of the brazing metal decreases axially outwardly beyond said outward enlarged portion of the recess in a direction of an opening of the recess, and an intermediate member made of a material having no joinability to the brazing metal is provided between a surface of a tip end of the projection and a bottom surface of the recess.

* * * * *